(12) United States Patent
Felton et al.

(10) Patent No.: US 8,776,990 B2
(45) Date of Patent: Jul. 15, 2014

(54) DUAL BELT CLEANER

(71) Applicant: Superior Industries, LLC, Morris, MN (US)

(72) Inventors: Jarrod J. Felton, Morris, MN (US); Owen Greg Rude, Montevideo, MN (US); Shane Jones, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 13/748,127

(22) Filed: Jan. 23, 2013

(65) Prior Publication Data
US 2013/0264173 A1    Oct. 10, 2013

Related U.S. Application Data

(60) Provisional application No. 61/632,454, filed on Jan. 24, 2012.

(51) Int. Cl.
B65G 45/16    (2006.01)

(52) U.S. Cl.
USPC ........................................................ 198/499

(58) Field of Classification Search
USPC ................................. 198/499, 497
See application file for complete search history.

(56) References Cited

U.S. PATENT DOCUMENTS

| | | | |
|---|---|---|---|
| 3,598,231 A | 8/1971 | Matson | |
| 3,722,667 A * | 3/1973 | Olson | 198/499 |
| 3,782,534 A | 1/1974 | Holleman | |
| 4,189,046 A * | 2/1980 | Ward et al. | 198/499 |
| 4,269,301 A | 5/1981 | Gibbs | |
| 4,402,394 A * | 9/1983 | Stoll | 198/499 |
| 4,529,084 A * | 7/1985 | Zhang | 198/499 |
| 4,533,035 A * | 8/1985 | Reiter | 198/499 |
| 4,586,600 A * | 5/1986 | Lindbeck | 198/499 |
| 4,795,024 A | 1/1989 | Eatwell | |
| 4,836,356 A * | 6/1989 | Mukai et al. | 198/499 |
| 4,850,474 A * | 7/1989 | Schwarze | 198/499 |
| 4,936,439 A * | 6/1990 | Alexander et al. | 198/499 |
| 4,953,689 A * | 9/1990 | Peterson et al. | 198/497 |
| 4,969,553 A | 11/1990 | Stoll | |
| 5,016,746 A * | 5/1991 | Gibbs | 198/499 |
| 5,222,589 A | 6/1993 | Gordon | |
| 5,518,107 A * | 5/1996 | Schwarze | 198/499 |
| 5,887,702 A | 3/1999 | Mott | |
| 5,950,803 A * | 9/1999 | Schwarze | 198/499 |
| 6,076,656 A * | 6/2000 | Mat | 198/499 |
| 6,439,373 B1 | 8/2002 | Swinderman | |
| 6,575,292 B2 | 6/2003 | Swinderman | |
| 6,820,734 B1 * | 11/2004 | Gilbert et al. | 198/499 |
| 7,549,532 B2 | 6/2009 | Ostman | |
| 7,819,237 B2 | 10/2010 | Felton | |
| 2004/0188224 A1 * | 9/2004 | Kolodziej et al. | 198/499 |
| 2006/0049023 A1 * | 3/2006 | Dietsch et al. | 198/499 |

* cited by examiner

*Primary Examiner* — Gene Crawford
*Assistant Examiner* — Keith R Campbell
(74) *Attorney, Agent, or Firm* — Dicke, Billig & Czaja, PLLC

(57) ABSTRACT

A cleaning assembly for a conveyor belt includes a first blade assembly, a second blade assembly, and a coupling mechanism supporting the first and second blade assemblies. The first blade assembly includes a first blade positionable into contact against a conveyor belt adjacent a turn portion of the belt. The second blade assembly includes a second blade positionable into contact against the belt downstream from the first blade.

28 Claims, 16 Drawing Sheets

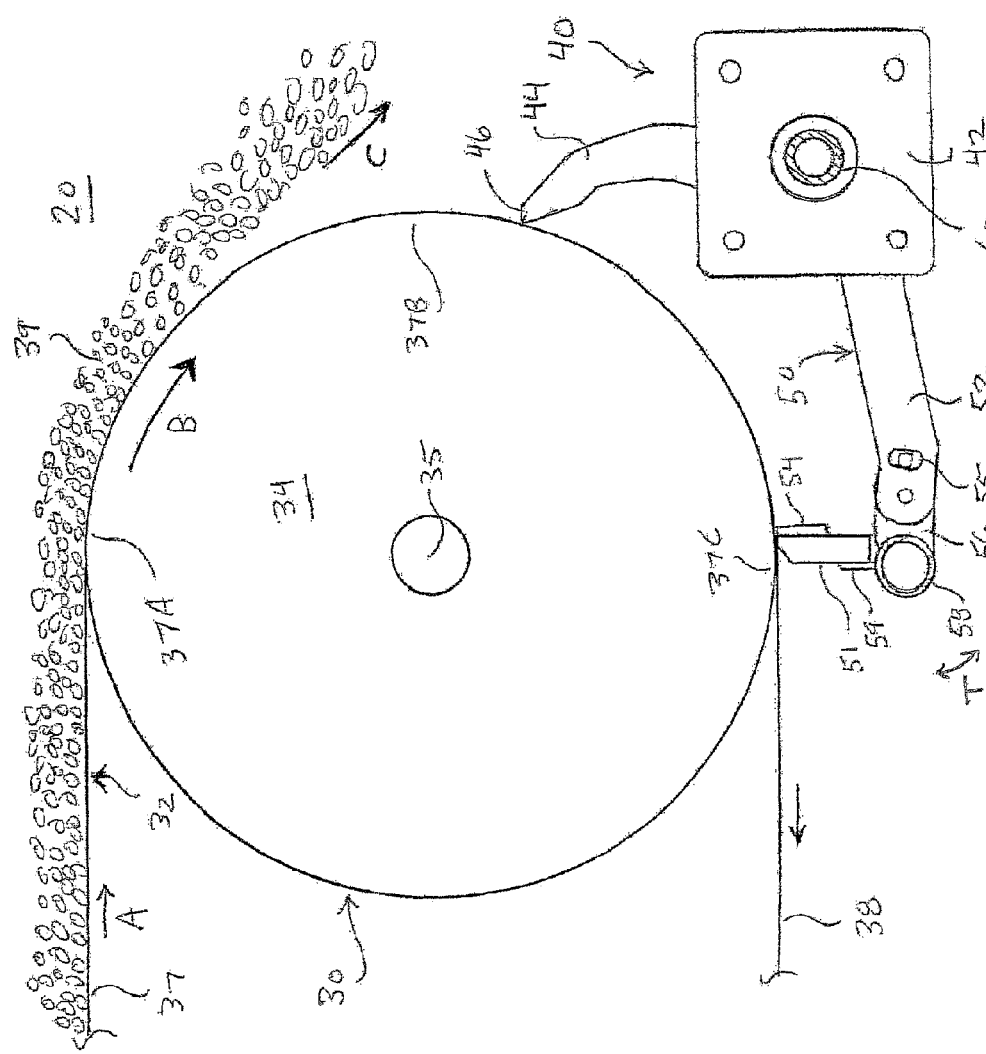

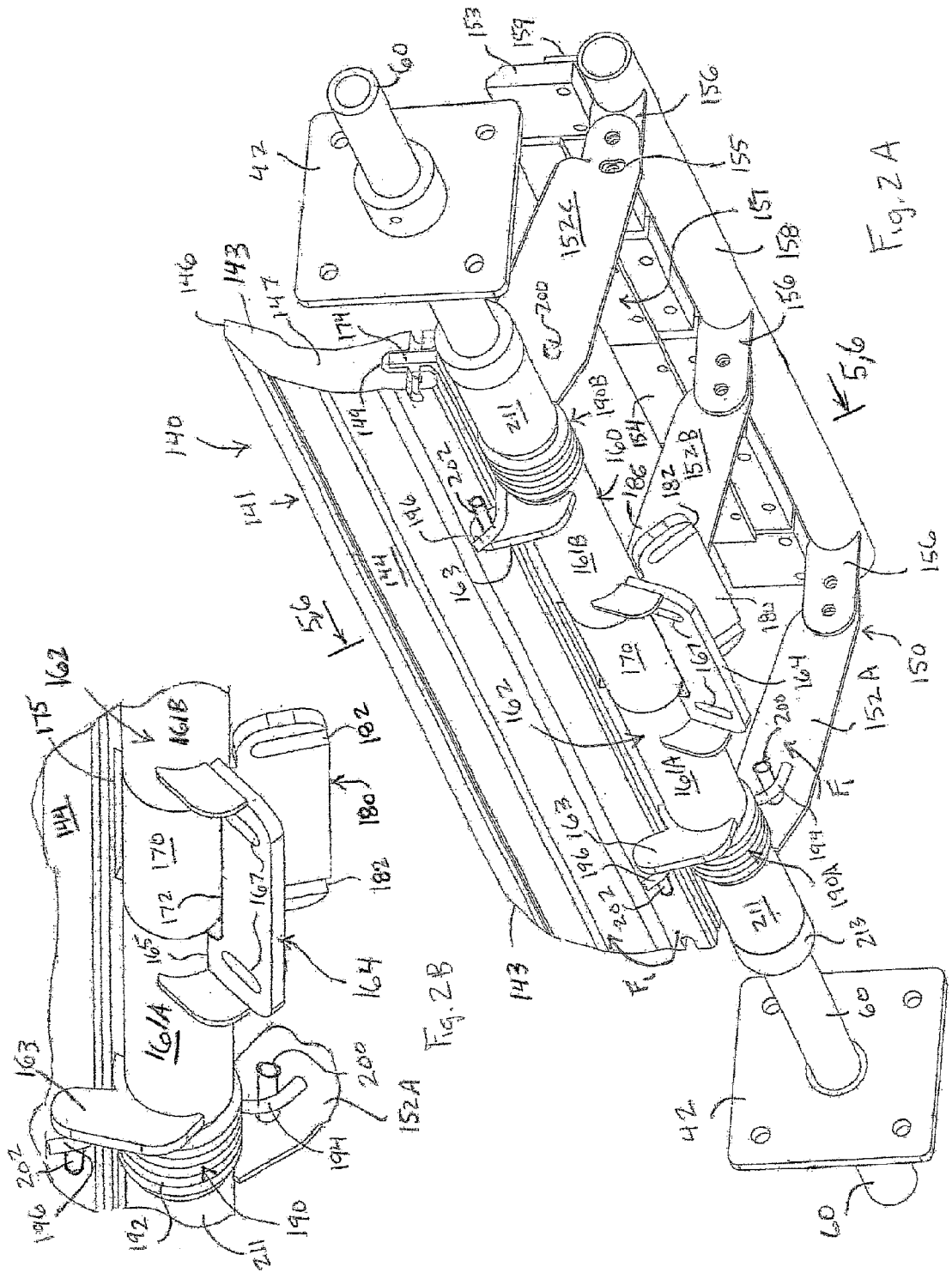

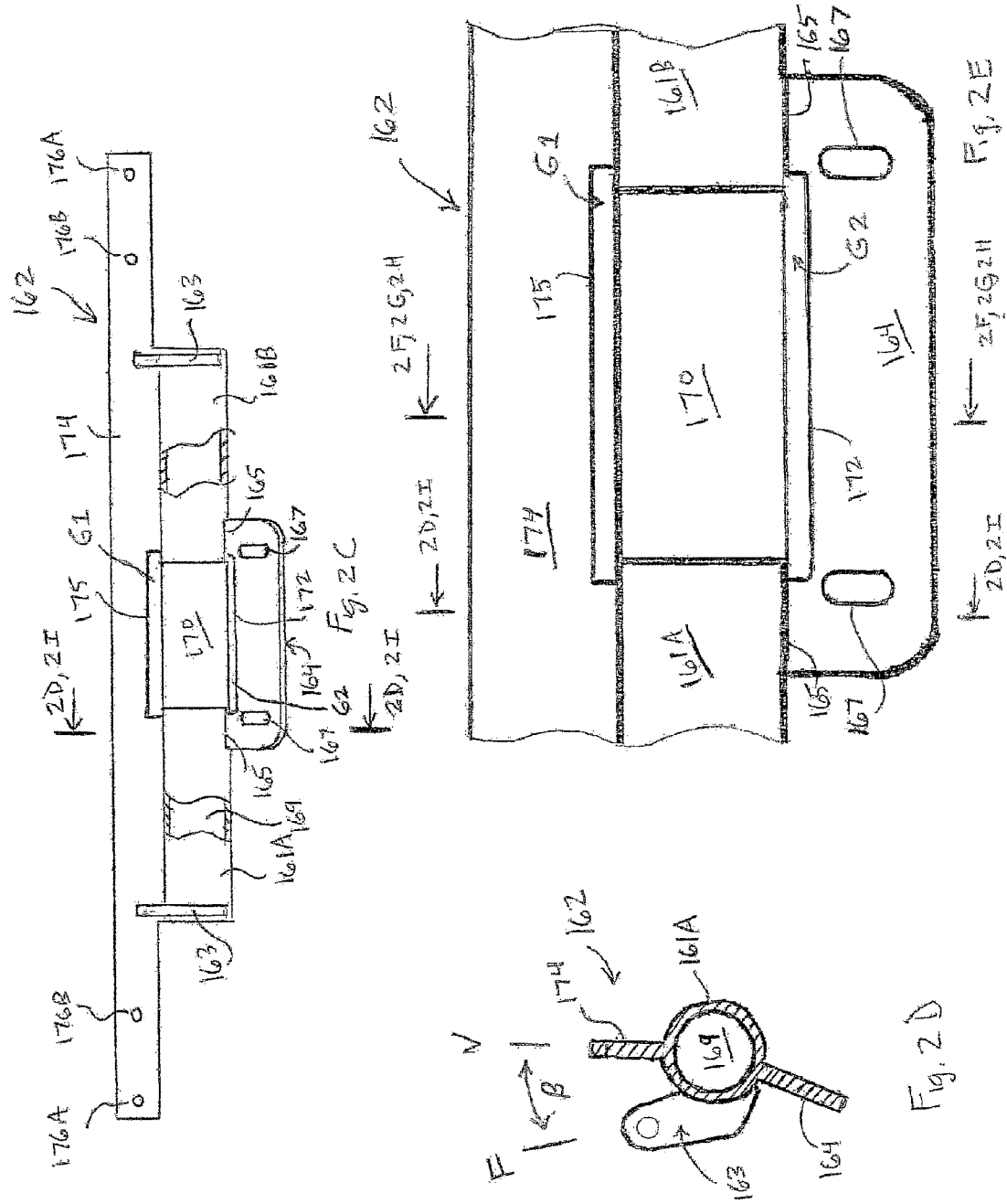

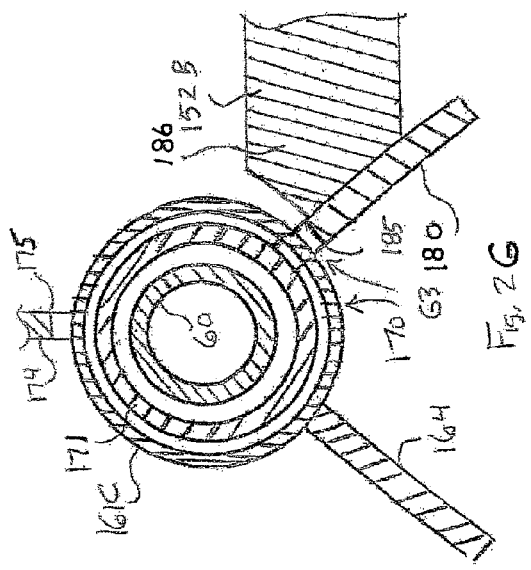
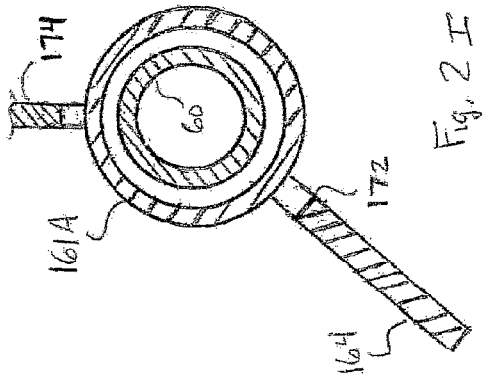
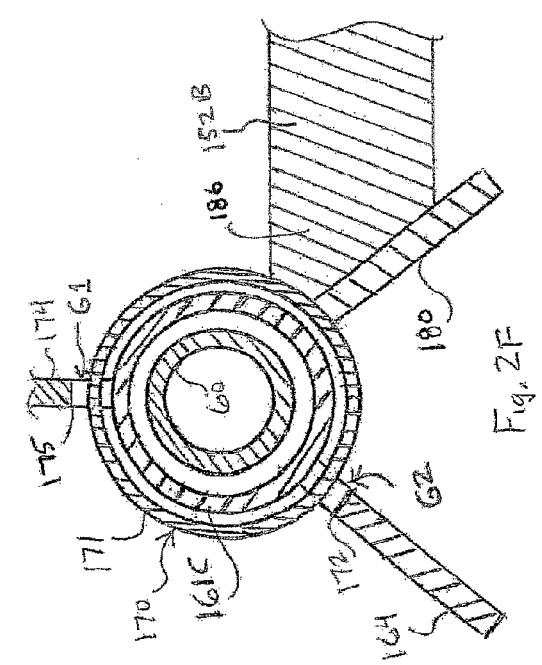
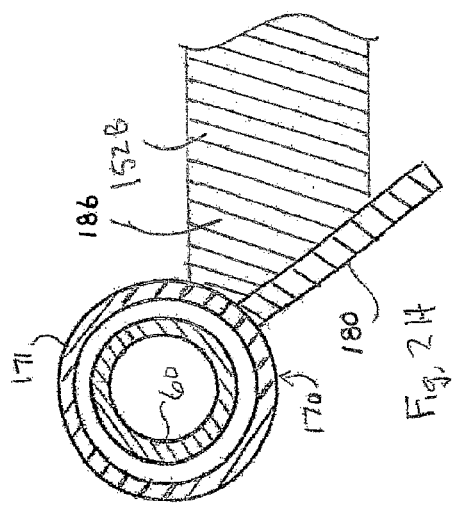

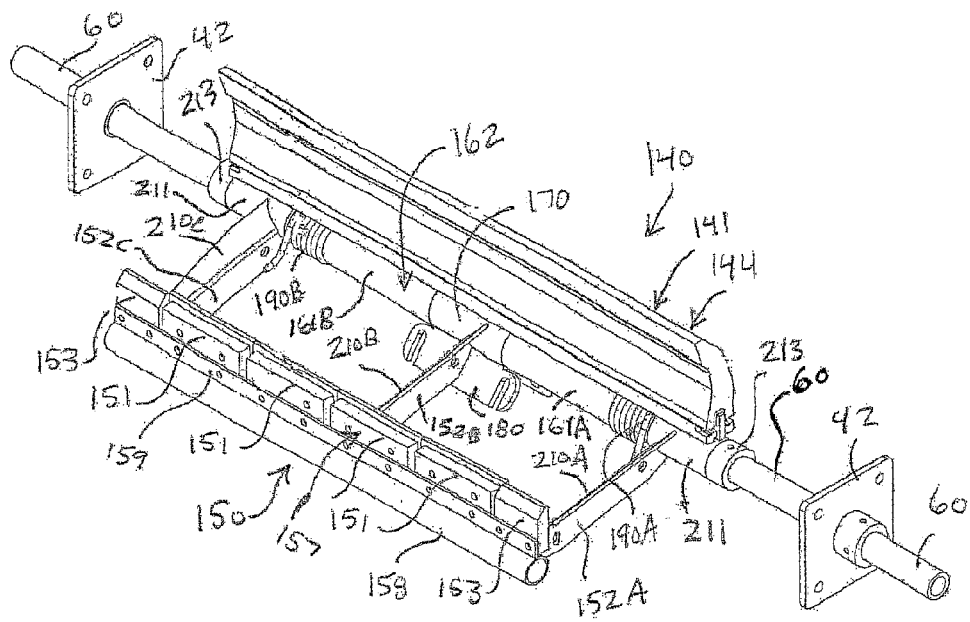
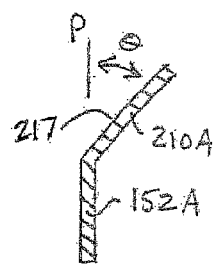
Fig. 3C
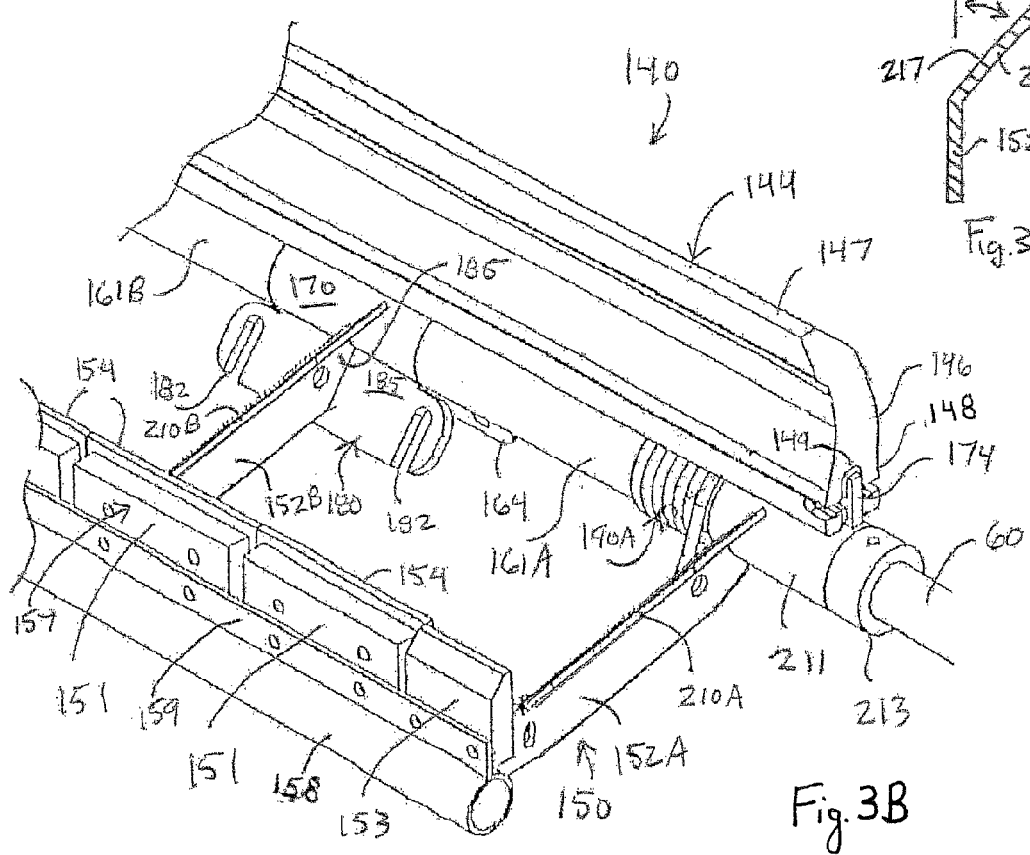
Fig. 3B

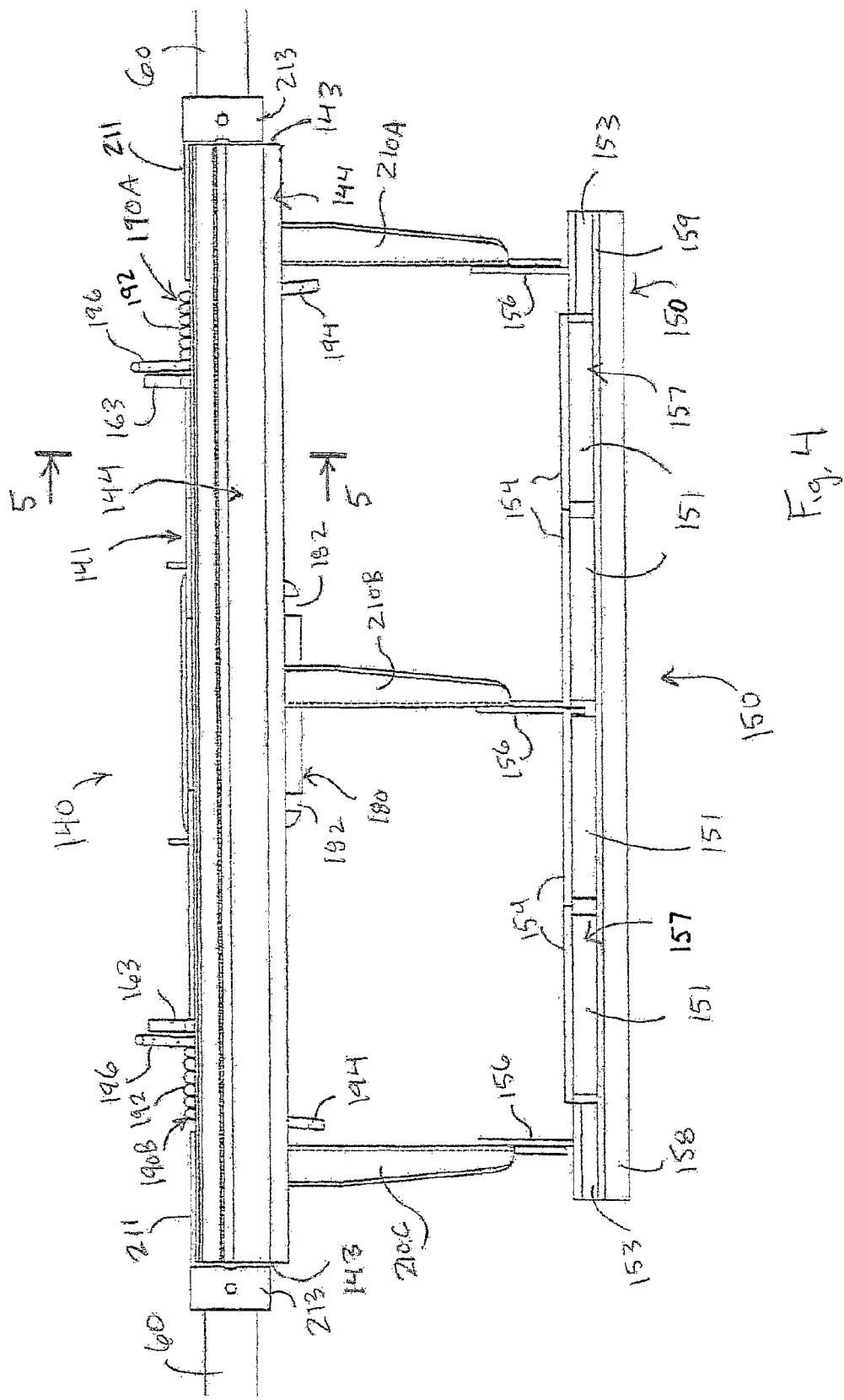

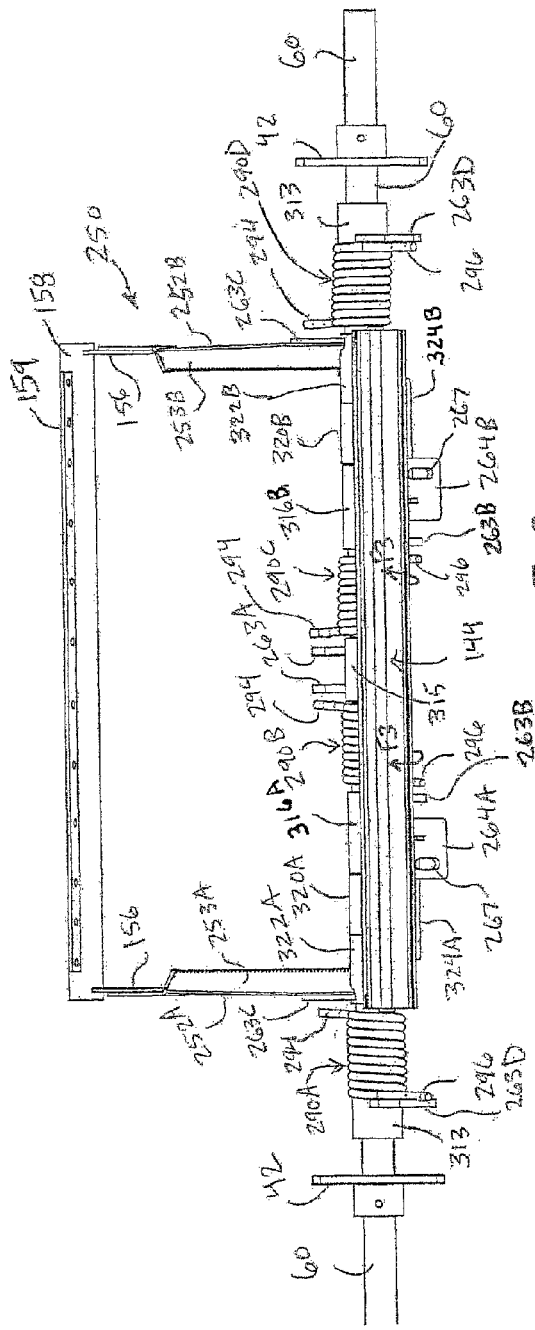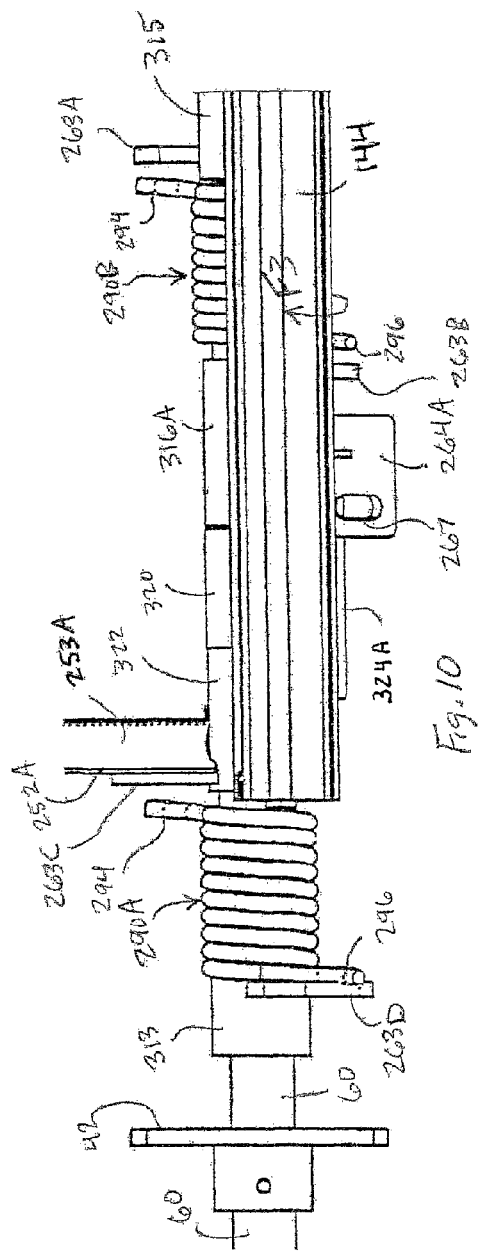

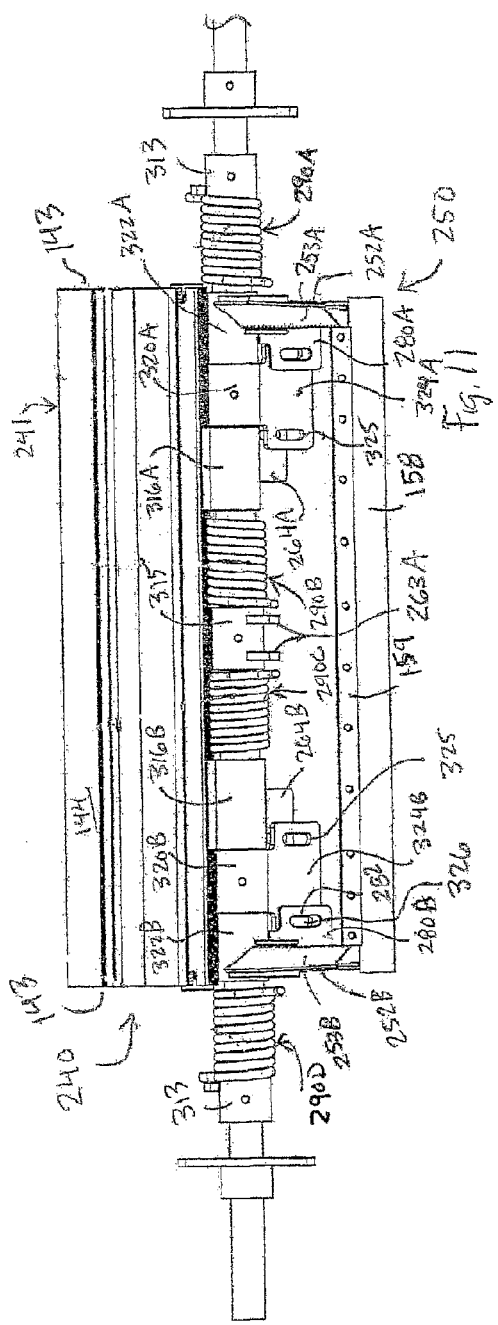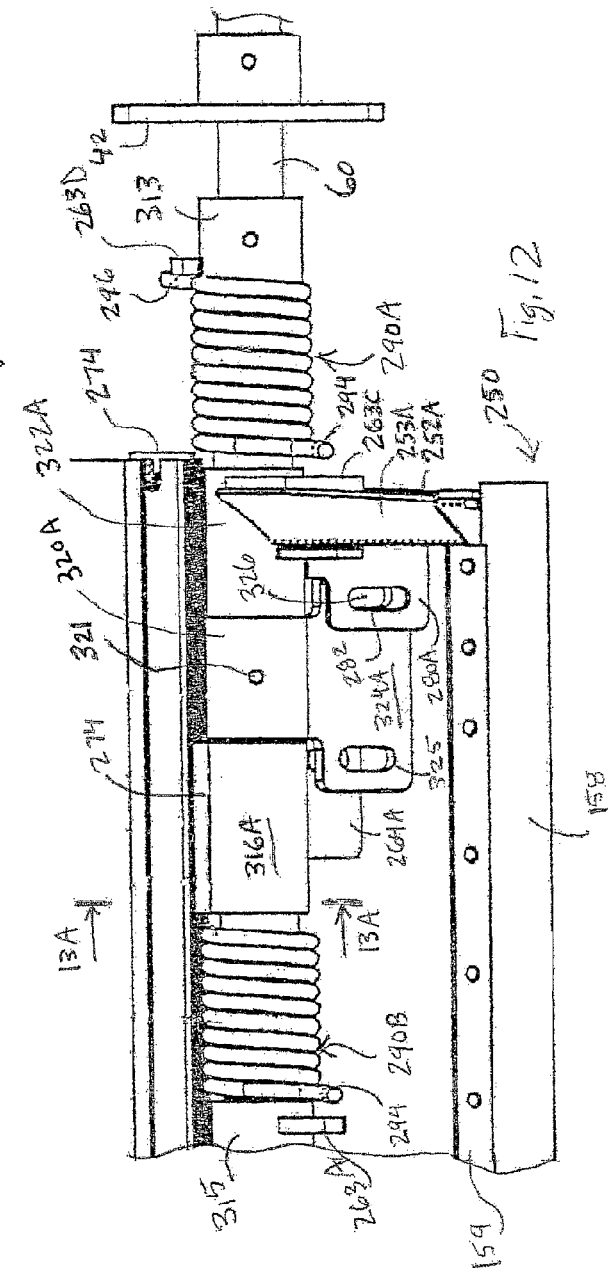

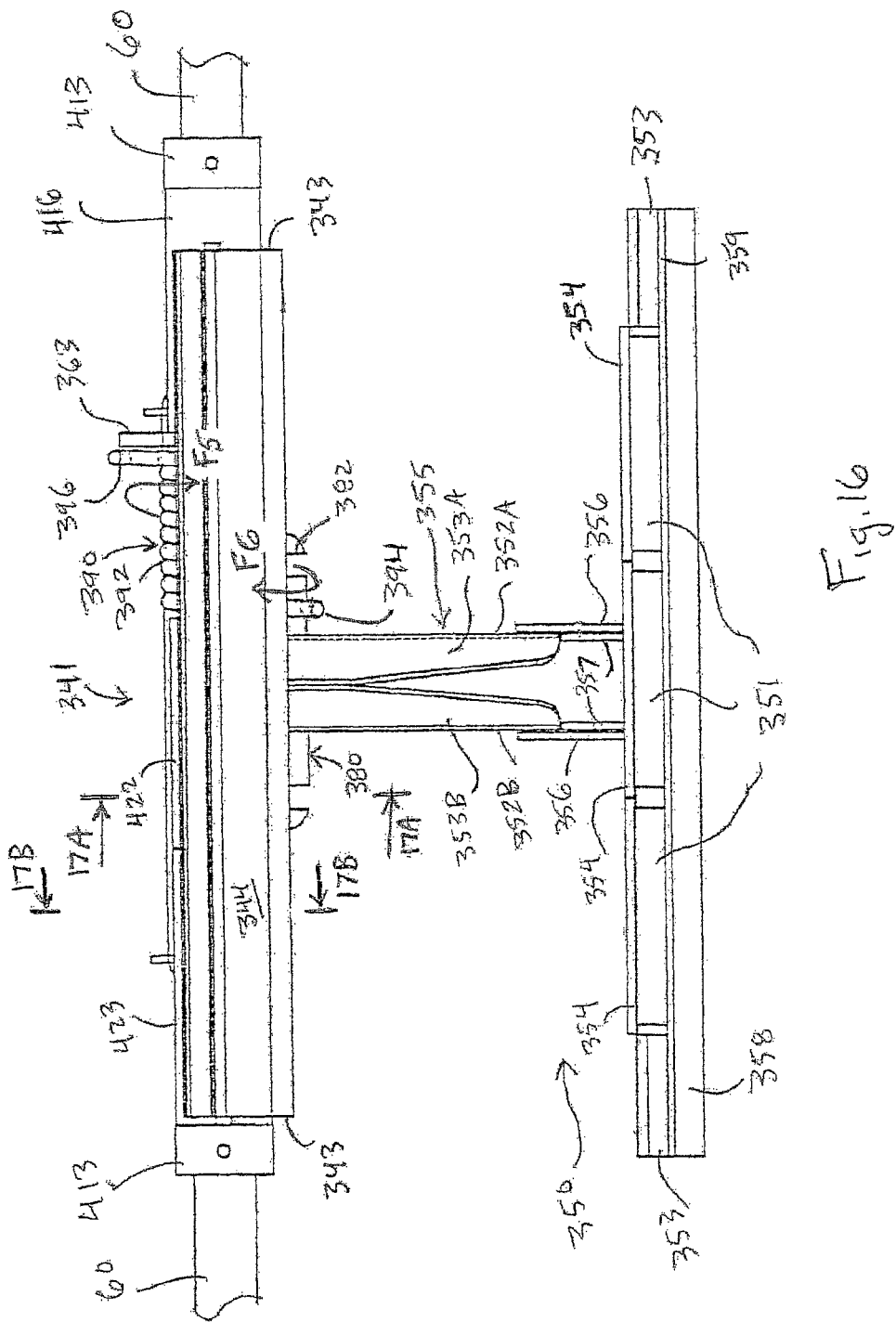

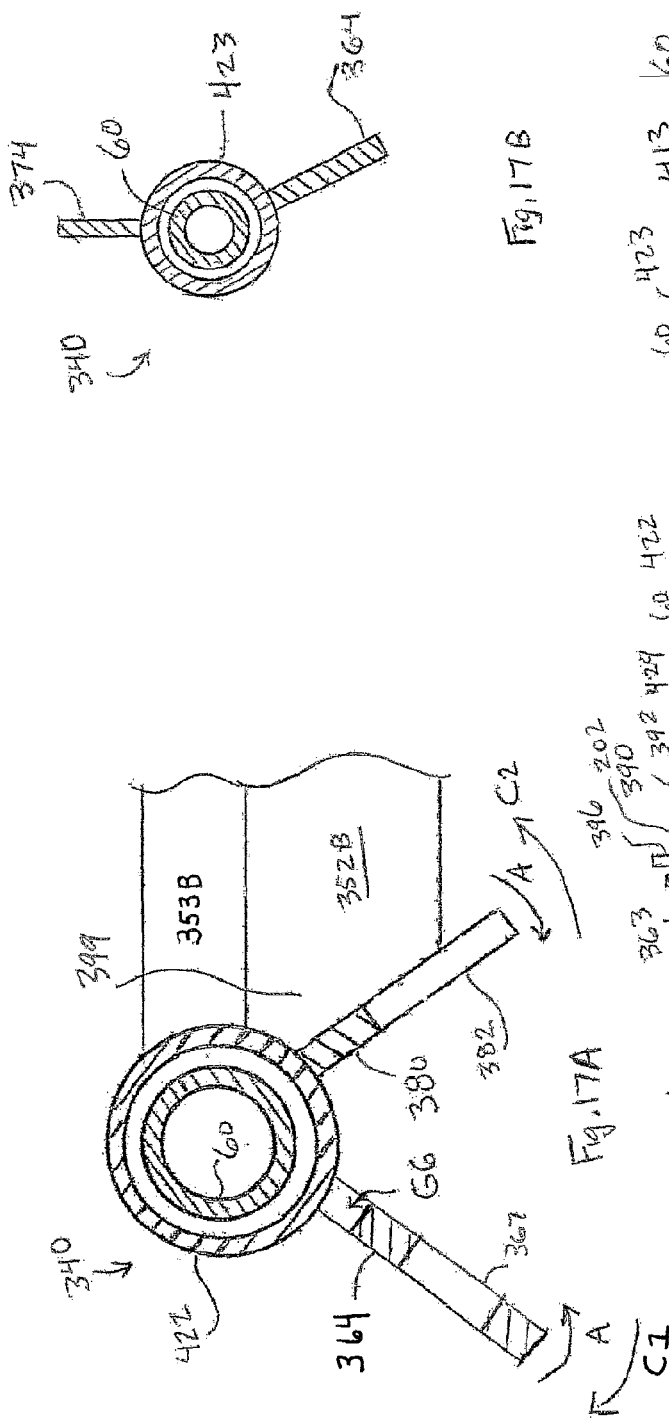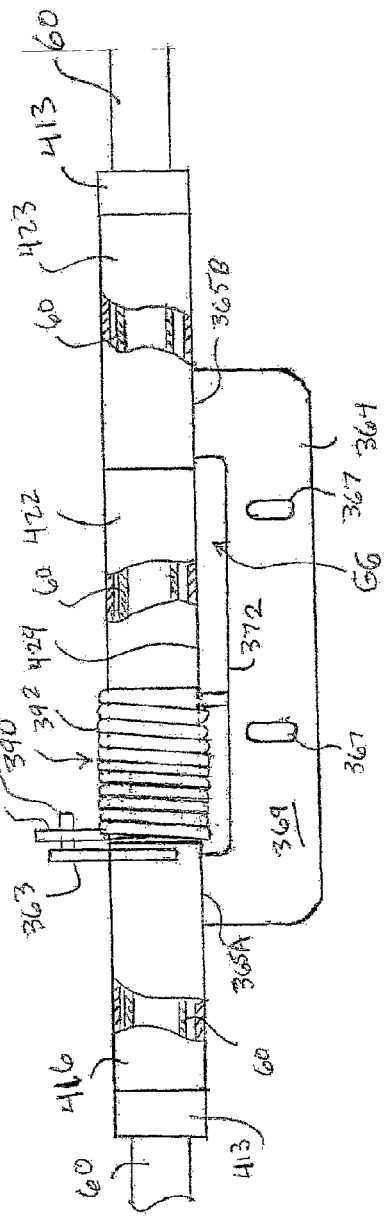

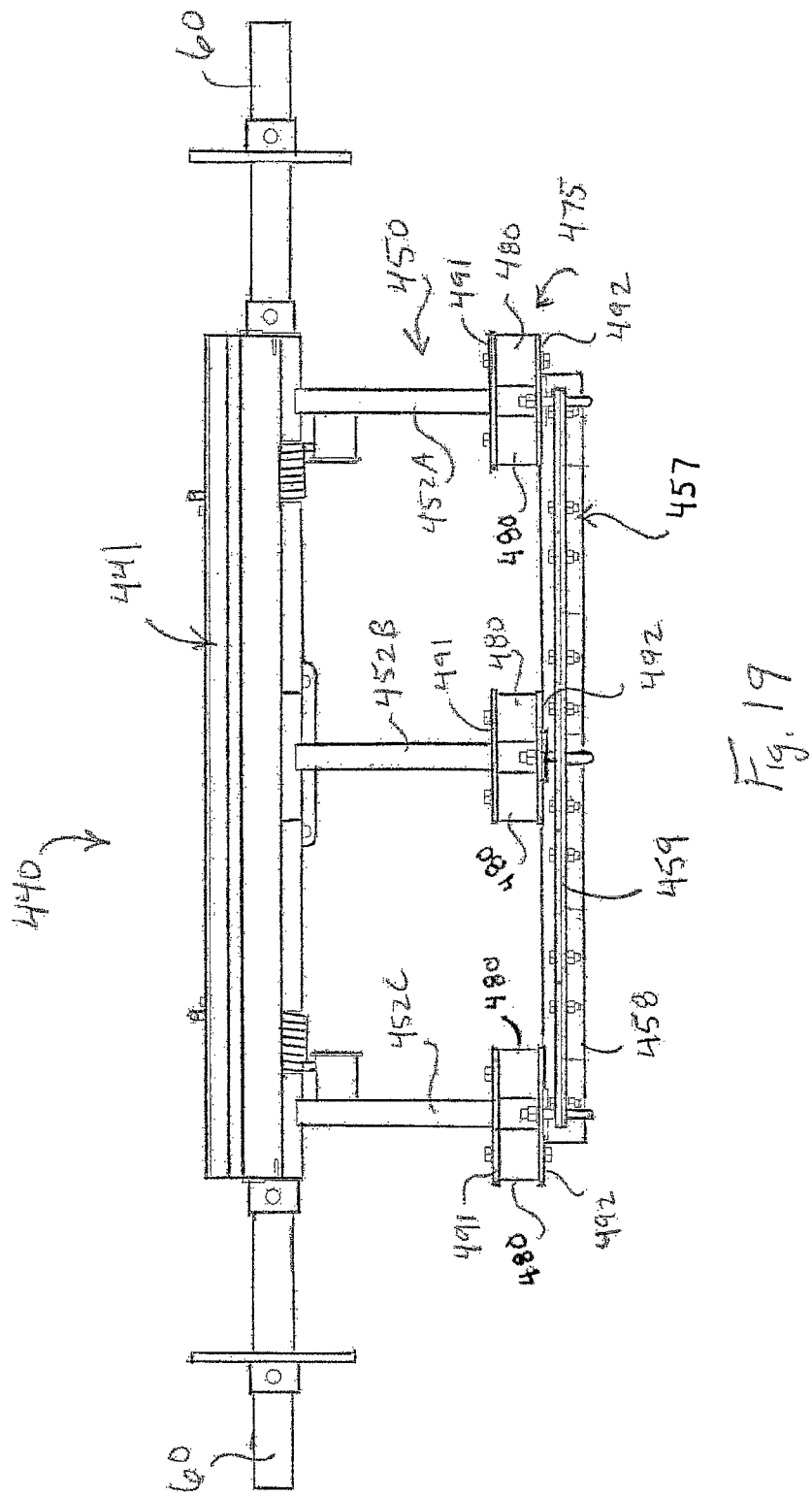

DUAL BELT CLEANER

CROSS-REFERENCE TO RELATED APPLICATIONS

This patent application claims priority to U.S. Provisional Application No. 61/632,454, filed Jan. 24, 2012.

BACKGROUND

In some instances, conveyor belts are used to transport loose materials which can result in a residue sticking to the surface of the conveyor belt. Accordingly, a belt cleaning device is typically employed at a location along the path of the belt just after the transported material has exited from the conveyor belt. One such location is at the head pulley. Over the years, various configurations of scrapers have been presented to clean a conveyor belt. While some types of scrapers might work well for some applications, they perform less admirably for other applications.

BRIEF DESCRIPTION OF THE DRAWINGS

The accompanying drawings are included to provide a further understanding of examples in the present disclosure and are incorporated in and constitute a part of this specification. The drawings illustrate examples and together with the description serve to explain principles of the examples of the present disclosure. Other examples and many of the intended advantages of examples will be readily appreciated as they become better understood by reference to the following detailed description. The elements of the drawings are not necessarily to scale relative to each other. Like reference numerals designate corresponding similar parts.

FIG. 1 is a side view schematically illustrating an example belt cleaner deployed on a conveyor belt.

FIG. 2A is a bottom isometric view schematically illustrating an example belt cleaner assembly.

FIG. 2B is an enlarged, partial bottom isometric view of the example belt cleaner assembly of FIG. 2A.

FIG. 2C is a top plan view schematically illustrating a sleeve assembly of an example primary blade assembly.

FIG. 2D is a sectional side view of the sleeve assembly of FIG. 2C.

FIG. 2E is an enlarged partial top plan view of the sleeve assembly of FIG. 2C.

FIG. 2F is a sectional side view taken along lines 2F-2F of FIG. 2E of the example belt cleaner assembly.

FIG. 2G is a sectional side view of an alternate sleeve assembly of an example belt cleaner assembly.

FIGS. 2H-2I are sectional side views of an alternate sleeve assembly of an example belt cleaner assembly.

FIG. 3A is a top isometric view schematically illustrating the example belt cleaner assembly of FIG. 2A.

FIG. 3B is an enlarged, partial top isometric view of the example belt cleaner assembly of FIG. 3A.

FIG. 3C is a sectional view of a support arm arid deflector of an example secondary blade assembly.

FIG. 4 is a top plan view schematically illustrating the example belt cleaner assembly of FIG. 2A.

FIG. 9 is a top plan view schematically illustrating the example belt cleaner assembly of FIG. 7.

FIG. 10 is an enlarged, partial an view of the example belt cleaner assembly of FIG. 9.

FIG. 11 is a front elevational view schematically illustrating the example belt cleaner of FIG. 7.

FIG. 12 is an enlarged, partial front elevational view of the example belt cleaner of FIG. 7.

FIG. 16 is a top plan view schematically illustrating the example belt cleaner assembly of FIG. 14.

FIG. 17A is a sectional side view as taken along lines 17A-1 7A of FIG. 16, which schematically illustrates the example belt cleaner assembly of FIG. 14.

FIG. 17B is a sectional side view as taken along lines 17B-17B of FIG. 16, which schematically illustrates the example belt cleaner assembly of FIG. 14.

FIG. 18 is a top plan view schematically illustrating a sleeve assembly of the example primary blade assembly of FIG. 14.

FIG. 19 is a top plan view schematically illustrating an example belt cleaner assembly having a secondary blade assembly including shock absorbing elements.

DETAILED DESCRIPTION

Figure 5:
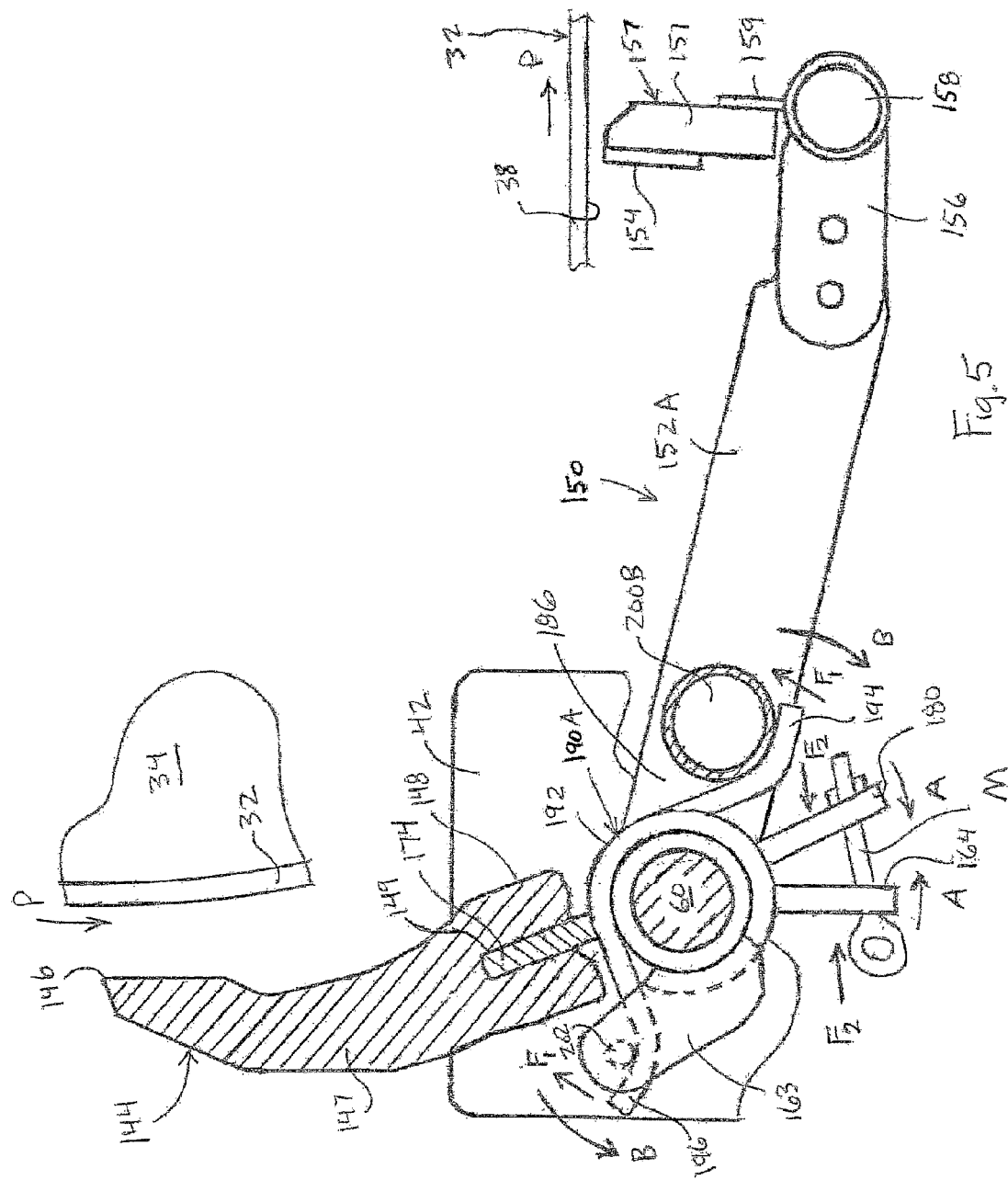
FIG. 5 is a schematic illustration generally corresponding to a partial sectional side view of the example belt cleaner assembly as taken along lines 5-5 of FIG. 2A.

In the following Detailed Description, reference is made to the accompanying drawings, which form a part hereof, and in which is shown by way of illustration specific examples of the present disclosure that may be practiced. In this regard, directional terminology, such as "top," "bottom," "front," "back," "leading," "trailing," etc., is used with reference to the orientation of the Figure(s) being described. Because components of the examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense.

Example belt cleaners of the present disclosure provide for effective and efficient cleaning of a conveyor belt by providing a single assembly that includes both a primary belt cleaner and a secondary belt cleaner that simultaneously remove debris from the belt. These example belt cleaners are described and illustrated in detail in association with FIGS. 1-19.

FIG. 1 is a diagram 20 including a side view that schematically illustrates a conveyor belt system 30 and an example belt cleaner assembly 40 of the present disclosure. As shown in FIG. 1, conveyor belt system 30 includes an endless belt 32 that travels about head pulley 34. Belt 32 carries materials 39 in direction A with belt 32 being driven by rotation (represented by directional arrow B) of at least head pulley 34. As material 39 on belt 32 travels over a top portion 37A of head pulley 34, the material 39 is effectively thrown outward (as represented by directional arrow C) away from the end portion 37B of head pulley 34 to a desired target location (not shown for illustrative purposes). As belt 32 continues in its rotational path about head pulley 34, belt 32 encounters the example belt cleaner assembly 40. Because head pulley 34 rotates about fixed axis 35 to drive translation of belt 32 and because head pulley 34 does not move horizontally or vertically, it will be understood that the references to a top, end, and bottom portion of head pulley 34 refer to positions of head pulley 34 that are generally maintained relative to the entire belt system 30 as head pulley 34 rotates on axis 35.

As shown in FIG. 1, the example belt cleaner assembly 40 includes a primary scraper blade 44 and a secondary scraper blade 51. In general terms, the primary scraper blade 44 is supported in a first orientation (e.g. a generally vertical orientation) so that a tip 46 of primary scraper blade 44 releasably engages the exposed surface of belt 32 at end portion 37B of head pulley 34. At the same time, via arm 52, the secondary scraper blade 51 is supported in a second orientation (e.g. a generally horizontal orientation) generally perpendicular to the first orientation to engage the exposed surface 38 of belt 32 at a bottom portion 37C of head pulley 34. In general terms, both primary scraper blade 44 and secondary scraper blade 51 are mounted for pivotal movement relative to a common axle 60. While not shown in FIG. 1, a biasing mechanism acts to urge primary scraper blade 44 and secondary scraper blade 51 toward each other via pivotal movement relative to axle 60. In this way, once the assembly 40 is mounted in close proximity to a conveyor belt 32 in the manner shown in FIG. 1, both the primary and secondary scraper blades 44, 51 are biased into forcible scraping engagement against belt 32 as belt 32 moves past each of the respective scraper blades 44, 51.

The example belt cleaners later described in association with FIGS. 2A-19 provide more detail regarding the different components, assemblies, and structures by which the respective scraper blades 44, 51 are pivotally mounted relative to axle 60 and the manner in which the respective scraper blades 44, 51 are biased for releasable engagement against belt 32.

Nevertheless, with further reference to FIG. 1, secondary scraper blade 51 is generally supported in its deployed position via arm 52, which extends generally horizontally from axle 60 (or at another angle in other examples). In one example, blade 51 and arm 52 form part of a secondary blade assembly 50. The secondary blade assembly 50 includes a sleeve 58 and mounting bar 59 with sleeve 58 including at least one flange 56. An outer portion of support arm 52 is connected to flange 56, thereby supporting sleeve 58 and mounting bar 59. Mounting bar 59 is positioned to support blade 51 in a generally vertical position to releasably engage and scrape a surface of belt 32. In some examples, blade 51 includes a removable tip 54.

In one example, an outer end of arm 52 includes a slot 55 to enable selective tilting of flange 56 (as represented by directional arrow T) relative to the outer end of arm 52, which in turn enables selectively altering the orientation of the blade 51 to contact belt 32 at different angles of attack. Once a desired degree of tilting of flange 56 relative to the outer end of arm 52 is achieved, a fastener is used in cooperation with slot 55 (and a hole in flange 56) to secure the flange 56 in that position. For example, blade 51 is typically oriented in a generally perpendicular position relative to surface of belt 32 to clean endless conveyor belts having a vulcanized fastener whereas blade 51 is typically oriented in a generally angled position (relative to surface of belt 32) to clean endless conveyor belts having mechanical fasteners.

In one aspect, secondary scraper blade 51 is located along the bottom portion 37C of head pulley 34, which is downstream along belt 32 from primary scraper blade 44. In this example, the secondary blade 51 engages the belt 32 in a region in which belt 32 is still in releasable contact on head pulley 34. However, in other examples, the secondary blade 51 engages the belt 32 in a region further downstream from the lower portion 37C of head pulley 34.

Accordingly, belt cleaner assembly 40 provides both a primary blade 44 and a secondary blade 51 in a single unit, thereby enabling compact, efficient mounting relative to belt 32 while achieving highly effective scraping action on belt 32. Moreover, because both blades 44, 51 are mounted relative to a single axle, the entire belt cleaner assembly 40 is mountable relative to a conveyor belt system by a single mounting point (i.e. the axle 60).

FIG. 2A is a bottom isometric view schematically illustrating an example belt cleaner assembly 140, while FIG. 2B is an enlarged, partial bottom isometric view that highlights certain features of belt cleaner assembly 140. In one example, belt cleaner assembly 140 includes at least substantially the same features and attributes of belt cleaner assembly 40, as previously described and illustrated in association with FIG. 1.

As shown in at least FIGS. 2A, 3A, and 4, the belt cleaner assembly 140 includes a primary blade assembly 141 and a secondary blade assembly 150. In general terms, via a biasing mechanism described more fully below, belt cleaner assembly 140 is mounted on axle 60 and configured to cause primary blade 144 and secondary blade array 157 to rotate toward each other so that when the belt cleaner assembly 140 is mounted (via axle 60) adjacent a conveyor belt 32 (e.g., at head pulley 34), both the primary blade 144 and secondary blade array 157 releasably engage and scrape belt 32 in a manner similar to that shown in FIG. 1.

As shown in at least FIGS. 2A-2B, the primary blade assembly 141 includes primary scraper blade 144 and a sleeve assembly 162. The primary blade 144 has a tip 146, body 147, and a bottom portion 148 defining a mounting slot 149. In one example, the primary scraper blade 144 is pivotally mounted relative to axle 60 via the sleeve assembly 162, which includes outer sleeve portions 161A, 161B, among other features further described below.

Meanwhile, as generally shown in FIGS. 2A, 3A, the secondary blade assembly 150 includes arms 152A-152C that are rotatably mounted relative to axle 60. An outer portion of each arm 152A, 152C connects to a respective one of three flanges 156 extending from a sleeve 158. The sleeve 158 supports a mounting bar 159, on which the array 157 of blades 151, 153 is mounted.

Outer arms 152A, 152C of secondary blade assembly 150 are rotatably mounted on axle 60 via sleeves 211. The sleeves 211 are independent of the outer sleeve portions 161A, 161B of sleeve assembly 162 with each respective spring 190A, 190B interposed between a respective one of the sleeves 211 (associated with arms 152A, 152C) and a respective one of the sleeve portions 161A, 161B. Accordingly, sleeves 211 are positioned laterally outward along axle 60 relative to sleeve portions 161A, 161B.

Center arm 152B of secondary blade assembly 150 also is rotatably mounted relative to axle 60. In particular, as generally shown in FIGS. 2A, 2F an inner portion 186 of central arm 152B is rotatably mounted to axle 60 via a central portion 170 of belt cleaner assembly 140. This central portion 170 denotes a portion of belt cleaner assembly 140 by which a portion of primary blade assembly 141 and a portion of secondary blade assembly 150 cooperate in a coaxial relationship (or by other means, in other examples) to maintain the ability of the primary blade assembly 141 and the secondary blade assembly 150 to rotate about axle 60 independent of one another. Further details regarding the components and operation of central portion 170 are described further below in association with the detailed description accompanying at least FIG. 2F.

As previously introduced above, primary blade assembly 141 includes a sleeve assembly 162 to rotatably mount primary blade 144 relative to axle 60. As best shown in FIGS. 2A, 2B and 2D, the sleeve assembly 162 (among other features) includes sleeve portions 161A, 161B, flanges 163, a load plate 164, and a rib 174. As best seen in FIGS. 2A and 2D, the rib 174 protrudes generally upwardly from a top portion of sleeve portions 161A, 161B and, in one example, extends substantially the entire length of the primary scraper blade 144. This rib 174 is sized and shaped to releasably engage the mounting slot 149 in the bottom portion 148 of the primary scraper blade 144, as seen in at least FIGS. 2A-2B, and 3B. In this way, blade 144 is removably mountable and can readily be replaced as desired.

As further shown in FIGS. 2C and 2E, in one example, rib 174 defines a recessed edge 175 along its bottom surface such that a gap G1 is defined between rib 174 and a top outer surface of central portion 170. The elongate gap G1 provides a passageway for rotational movement in the region of central portion 170, as further described below. In one example, the elongate gap G1 has a length slightly greater than a length of central portion 170.

In addition, as best seen in FIGS. 2C-2E, at a generally opposite side of sleeve assembly 162 from rib 174, a load plate 164 protrudes outwardly from sleeve portions 161A, 161B. The load plate 164 includes a recessed edge 172 such that a gap G2 is defined between load plate 164 and a bottom outer surface of central portion 170. The load plate 164 further includes a pair of spaced apart base portions 165 with each base portion 165 connected to and extending outward from the respective sleeve portions 1161A, 161B. The gap G2 is sized and shaped to enable rotational movement of components of central portion 170 within gap G2 so that central arm 152B (and consequently the rest of secondary blade assembly 150) can rotate relative to axle 60 independent of primary blade assembly 141. Moreover, the gap G2 also permits rotation of load plate 164 relative to central portion 170. In one example, the elongate gap G2 has a length that is slightly greater than a length of central portion 170. Holes 167 in load plate 164 are provided to receive one end of a variable length fastener (M) used in cooperation with load plate 180 of secondary blade assembly 150, as further described later regarding installation and maintenance of belt cleaner assembly in association with FIGS. 5-6.

With reference to FIGS. 2A-2D, sleeve assembly 162 also include flanges 163 which protrude outward and generally upward from a rear surface portion of sleeves 161A, 161B. In one example, as best seen in FIG. 2D, a longitudinal axis (represented by line F) of each flange 163 defines an acute angle ($\beta$) relative to a vertical axis V. In another aspect, each flange 163 supports a pin 202 that protrudes outwardly toward one of the ends of axle 60. In one example, the pin 202 is permanently affixed to flange 163, while in other examples, the pin 202 is removably attached to flange 163.

In one aspect, the belt cleaner assembly 140 includes a biasing mechanism configured to cause rotation of the primary blade 144 and of the secondary blade array 157 toward and against the conveyor belt 32 at head pulley 34 (FIG. 1). In one example, as further shown in FIG. 2A, the biasing mechanism includes a pair of springs 190A, 190B with each spring 190A, 190B mounted about axle 60 in a position laterally outward from each of sleeve portions 161A, 161B of sleeve assembly 162 so that each spring 190A, 190B is located in close proximity to each flange 163. Each spring 190A comprises a helical torsion spring that includes a central coil portion 192, and a pair of free ends 194, 196 extending outwardly from opposite ends of the central coil portion 192. When loaded at free ends 194, 196, the torsion spring 190A, 190B exerts a rotational force (represented by directional force arrows F1) about an axis generally parallel to a longitudinal axis of axle 60. As further shown in FIGS. 2A-2B, for each spring 190B, 190B, the free end 196 is releasably engaged against pin 202 of the respective flange 163 at the ends of sleeve assembly 162. The other free end 194 of respective springs 190A, 190B engages pin 200 on arms 152A, 152C of secondary blade assembly 150, as best seen in at least FIGS. 2A-2B and 3A.

Figure 6:
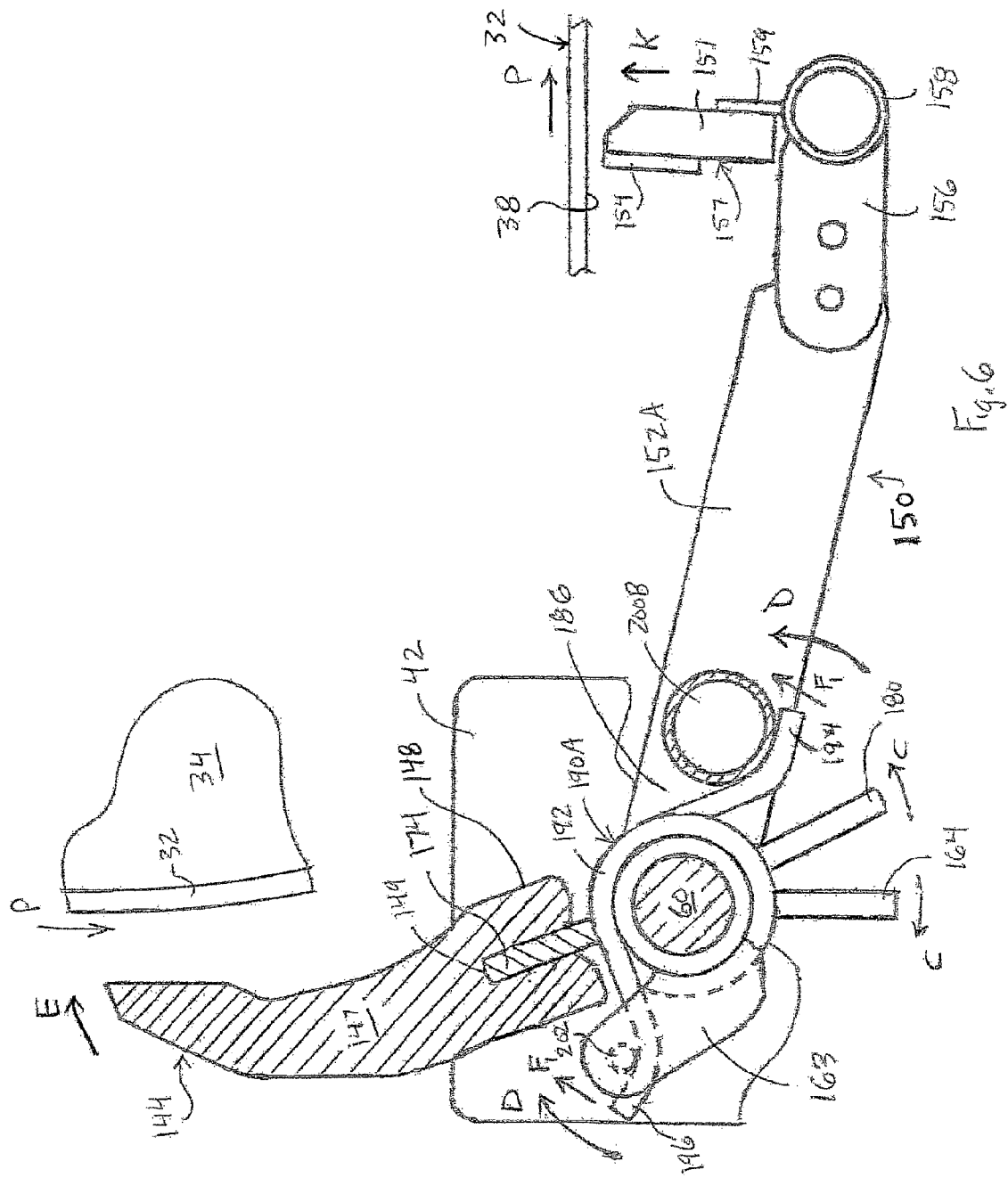
FIG. 6 is a schematic illustration generally corresponding to a partial sectional side view of the example belt cleaner as taken along lines 6-6 of FIG. 2A.

FIG. 6 is a sectional view taken along lines 6-6 of FIG. 2A that further schematically illustrates the operation of springs 190A, 190B as a biasing mechanism. As shown in FIG. 6, springs 190A, 190B are mounted on belt cleaner assembly 140 to be under torsion so that with free ends 194, 196 releasably engaged against the respective pins 202, 200, the respective springs 190A, 190B apply a rotational force at each free end 194, 196 as schematically represented via directional arrows F1. The rotational force exerted by free end 196 causes rotational movement of flange 163 (as represented by directional arrow D) and portions of sleeve assembly 162 about axle 60, which causes primary blade 144 to rotate toward and against belt 32 (FIG. 1), as represented by directional arrow E. At the same time, the rotational force (F1) exerted by free end 194 (of springs 190A, 190B) causes rotational movement of at least sleeves 211 and arms 152A, 152C (as represented by directional arrow D), which in turn, causes secondary blade array 157 to rotate toward and against belt 32 (FIG. 1), as represented by directional arrow K, at a point downstream from primary blade 144. In addition, a portion of secondary blade assembly 150 associated with central portion 170 is rotatable about axle 60 to allow center arm 152B to rotate in synchronization with outer arms 152A, 152C. Further details regarding central portion 170 are provided below.

Central portion 170 of sleeve assembly 162 can take one of several different configurations and enables primary blade assembly 141 and secondary blade assembly 150 to rotate independent of each other about axle 60 while maintaining alignment of load plate 164 of primary blade assembly 141 and load plate 180 of secondary blade assembly 150, which enables selective application of a compressive force to temporarily counteract the rotational biasing force of springs 190A, 190B, as further described later in association with FIGS. 5-6.

These example configurations of central portion 170 are described and illustrated in association with at least FIGS. 2F-2I, which are sectional views as taken along lines 2F-2F, 2G-2G, 2H-2H, and lines 2I-2I, respectively, in FIGS. 2C, 2E.

In one configuration, as shown in at least the sectional view of FIG. 2F, central portion 170 defines a coaxial relationship between a sleeve 171 of secondary blade assembly 150 and a central sleeve portion 1610 of sleeve assembly 162 of primary blade assembly 141. In this example, sleeve 171 extends from inner end 186 of arm 152B while a sleeve portion 161C forms part of a single elongate sleeve that includes sleeve portion 161A, sleeve portion 161C, and sleeve portion 161B with central sleeve portion 161C interposed between sleeve portions 161A, 161B.

In this example configuration, sleeve portion 161C is rotatably mounted about axle 60 and is positioned coaxially within sleeve 171 of secondary blade assembly 150 with sleeve 171 being rotatably movable about sleeve portion 161C. Accordingly, sleeve portion 161C is not visible in FIGS. 2A-2C, 2E. As further shown in FIG. 2F, sleeve 171 extends through gap G2 (defined between recessed edge 172 of load plate 164 and an outer surface of sleeve 161C) and extends through gap G1 (defined between recessed edge 175 of rib 174 and an outer surface of sleeve portion 161C) which allows sleeve 171 to be coaxially disposed about and rotatable relative to sleeve 161C. Moreover, this arrangement enables a load plate 180 of secondary blade assembly 150 to be aligned relative to load plate 164 of primary blade assembly 141, as best seen in FIGS. 2A, 2B to enable application of a compressive force to and through those load plates 164, 180 to selectively overcome the biasing mechanism of springs 190A, 190B.

It will be understood that in some examples of central portion 170, additional bearing surfaces and/or elements are interposed between the respective sleeves (e.g. sleeve 171, sleeve portion 161C, axle 60, etc.) to ensure longevity and smooth movement between the components that rotate relative to one another, In a second example configuration, as shown in at least FIG. 2G, central portion 170 defines a coaxial relationship between a sleeve 171 of secondary blade assembly 150 and a central sleeve portion 161C of sleeve assembly 162 of primary blade assembly 141. In this example, central sleeve portion 161C would be visible in FIGS. 2A-2C, 2E while sleeve 171 would not be visible in those views. In addition, like the previous example configuration, in combination with sleeve portions 161A, 161B, the central sleeve portion 161C forms part of a single elongate sleeve. Finally, in alternate configurations such as this second example configuration, a set of corresponding changes (e.g. locations of gaps G1, G2) would occur in the belt cleaner assembly 140 that are not currently depicted in FIGS. 2A-2E.

In this example configuration illustrated in sectional view FIG. 2G, sleeve 171 is rotatably mounted about axle 60 and is positioned coaxially within sleeve portion 161C of primary blade assembly 141 with sleeve portion 161C being rotatably movable about sleeve 171. As further shown in FIG. 2G, sleeve 161C extends through gap G3 (defined between recessed edge 185 of load plate 180 and an outer surface of sleeve 171) which allows central sleeve portion 161C to be coaxially disposed about and rotatable relative to sleeve 171. Moreover, this arrangement enables load plate 180 of secondary blade assembly 150 to be aligned relative to load plate 164 of primary blade assembly 141, as best seen in FIGS. 2A-2B, to enable application of a compressive force to and through those load plates 164, 180 to selectively overcome the biasing mechanism of springs 190A, 190B.

In a third example configuration, central portion 170 is defined by solely by a sleeve 171 from which inner end 186 of central arm 152B extends, as shown in FIG. 2H. Accordingly, the central portion 170 visible in FIGS. 2A-2C, 2E is defined by sleeve 171. Sleeve 171 is directly mounted about axle 60, and supports a second load plate 180 extending outward from sleeve 171. In another aspect, sleeve 171 is interposed between sleeve portions 161A, 161B of sleeve assembly 162, which are directly mounted on axle (as shown in FIG. 2I) at a position laterally outside of central portion 170, as illustrated in FIGS. 2C, 2E. In this configuration, the sleeve 171 is in a side-by-side relationship with sleeve portions 161A, 161B instead of the coaxial relationship depicted in the configurations of FIGS. 2F and 2G. In this side-by-side example configuration associated with FIGS. 2H-2I, sleeve assembly 162 of primary blade assembly 141 omits a central sleeve portion 161C such that sleeve portions 161A, 161B each comprise separate sleeves. Of course, sleeve portions 161A, 161B are still connected together in sleeve assembly 162 by rib 174 and by load plate 164. It will be understood that in this alternate configuration associated with FIGS. 2H-2I, corresponding changes (e.g. location/presence of gaps G1, G2) would occur in FIGS. 2A-2E.

Accordingly, regardless of the particular example configuration of central portion 170, belt cleaner assembly 140 includes a central portion by which primary blade assembly 141 and secondary blade assembly 150 can rotate independently and by which a central portion of the load plates 164, 180 are maintained in alignment with each other along a plane extending generally transverse to a longitudinal axis of the axle 60.

FIG. 3A is a top isometric view that further schematically illustrates the example belt cleaner assembly 140. As shown in FIG. 3A, in one example, the secondary blade assembly 150 further includes an array of material deflectors 210A-210C with one of the respective deflectors mounted on a top portion of each arm 152A-152C, respectively. As further shown in the sectional view of FIG. 3C, the deflectors 210A-210C are mounted at an acute angle (θ) relative to a vertical plane (represented by line P) so that any residual material falling from belt 32 will contact surface 217 of deflector 210A-210C and slide down through the gaps between arms 152A-152C. In this way, secondary blade assembly 150 prevents excessive buildup of residual material on arms 152A-152C of secondary blade assembly 150.

In another aspect, FIGS. 3A-3B further depict toad plate 180 of secondary blade assembly 150. As shown in FIGS. 3A-3B, load plate 180 includes a pair of slots 182 for receiving a fastener to releasably couple load plate 180 to load plate 164, as further described later in association with FIGS. 5-6. Load plate 180 includes a base portion 185 connected to and extending from a surface of a sleeve at central portion 170.

FIGS. 3A-3B also further illustrate an example secondary scraper blade array 157. As shown in FIGS. 3A-3B, array 157 includes a series of blades 151 arranged side-by-side via mounting on mounting bar 159. In other examples, blade array 157 is replaced with a single elongate blade that spans substantially the entire length of mounting bar 159. In one aspect, a hardened tip 154 is mounted on each blade 151. In addition, in some examples, blade array 157 includes a pair of outer blades 153 that define an outer edge of blade array 157 with outer blades 153 omitting tip 154.

Collars 213 are fixed relative to axle 60 to contain the components (e.g. springs 190A, 190B, sleeves 211, and sleeve assembly 162) of primary blade assembly 141 and secondary blade assembly 150 within the boundaries set by collars 213.

While pins 200 are omitted from their mounted positions on arms 152A, 152C in FIGS. 3A-3B, free end 194 of springs 190A, 190B are still depicted in a position corresponding to engagement against such pins 200.

FIG. 4 is a top plan view of the example belt cleaner assembly 140, which further depicts various components previously described and illustrated in association with FIGS. 1-3B and 5-6.

While certain components of belt cleaner assembly 140 were previously described in association with FIG. 6, further reference is now made to FIGS. 5-6 to present further details regarding installation and operation of the example belt cleaner assembly 140 relative to a conveyor belt system 30.

In one aspect, FIG. 5 represents a state of belt cleaner assembly 140 prior to installation relative to a belt conveyor system 30 or during maintenance after installation. FIG. 5 is a sectional view taken along lines 5-5 of FIG. 4. While FIG. 5 depicts just one half of belt cleaner assembly 140, because belt cleaner assembly 140 is symmetric in design, it will be understood that the other respective half (including spring 190B) would operate simultaneously in substantially the same way. As shown in FIG. 5, spring 190A is in a loaded state exerting a torsional force (represented by directional force arrows F1) against the respective pins 202, 200 to urge rotation of primary blade assembly 141 and secondary blade assembly 150, in the manner previously described.

With this mind, it will be understood that in order to install the belt cleaner assembly 140 relative to a conveyor belt system 30, the rotational force exerted by the biasing mechanism (e.g. springs 190A, 190B) needs to be counteracted until the axle 60 of belt cleaner assembly 140 is mounted in a desired position relative to conveyor belt 30 and head pulley 34. Accordingly, by mounting a variable length fastener M (e.g. a bolt and nut combination) through the slots 167 of load plate 164 of primary blade assembly 141 and slots 182 of load plate 180 of secondary blade assembly 150, and upon shortening the operative length of the fastener (e.g. turning a nut on the bolt), a compressive force (F2) is exerted against the load plates 164, 180 to cause their rotation inward (represented by directional arrow A) toward each other as shown in FIG. 5. This inward rotational movement of load plates 164, 180, in turn, causes a rotation of primary blade assembly 141 and secondary blade assembly 150 (represented by directional arrows B) as the forces F2 on load plates 164, 180 overcome the forces F1 of torsional spring 190A. As shown in FIG. 5, with belt cleaner assembly 140 mounted and positioned relative to a conveyor belt system 30, the application of the compressive forces F2 at load plates 164, 180 maintain the tip 146 of primary blade 144 to be spaced apart (or retracted) from a surface of belt 32 and the tip 154 of secondary blade 151 to be spaced apart (or retracted) from a surface of belt 32.

Accordingly, with axle 60 of the belt cleaner assembly 140 finally mounted (via a bracket structure, for example) relative to the conveyor belt system 30, the variable length fastener is lengthened and/or removed from load plates 164, 180, as shown in FIG. 6, to eliminate the compressive forces F2 and allow load plates 164, 180 to rotate away from each other (as represented by directional arrows C), which in turn results in an inward rotation of primary blade assembly 141 and secondary blade assembly 150 (as represented via directional arrows D) to cause tip 146 of primary blade 144 to move (as represented by directional arrow E) into engagement against belt 32 and to cause tip 154 of secondary blade array 157 to move (as represented by K) into engagement against belt 32.

Once primary blade 144 and secondary blade array 157 engage belt 32, the biasing mechanism of springs 190A, 190B continue to apply a rotational force (F1) to forcibly maintain the respective blades 144, 157 against belt 32. Accordingly, even as tips 146, 154 of the respective blades 144, 157 wear down, the rotational force (F1) applied via the biasing mechanism ensures that the blades 144, 157 remain engaged against belt 30. Moreover, because springs 190A,190B exhibit elasticity, the springs 190A, 190B also can act as a shock absorber in the event that the blades 144, 157 encounter a bump on belt 32 while still urging the blades 144, 157 against belt 32.

In order to change one of the blades 144, 157, a compressive load (via a variable length fastener or other means) is applied again to load plates 164, 180 as shown in FIG. 5 to cause the primary blade assembly 141 and secondary blade assembly 150 to retract from belt 32 and to enable replacement of one or both blades 144, 157.

In one example, all pivoting portions of respective primary and secondary blade assemblies 140, 151 are located within boundaries defined by the outer edges 143 of primary scraper blade 144, such as one example shown in FIG. 2A. In one example, the biasing mechanism provided via springs 190A, 190B, (for biasing the respective primary and secondary blade assemblies to rotate toward and against belt 32) also is located within boundaries defined by the outer edges 143 of primary scraper blade 144. In other words, the pivoting mechanisms and the biasing mechanism are not located laterally external to the outer edges 143 of primary scraper blade 144. Accordingly, rotational forces created by a biasing mechanism of belt cleaner assembly 140 are more directly translated into rotational movement of primary and secondary blade assemblies 141, 150 while simultaneously avoiding mechanical clutter in an area laterally beyond the outer edges of the primary scraper blade 144.

FIGS. 7-12 illustrate another example belt cleaner system. As shown in the top isometric views of FIGS. 7-8, an example belt cleaner assembly 240 includes a primary blade assembly 241 and a secondary blade assembly 250. In one example, belt cleaner assembly 240 includes at least substantially the same features and attributes as belt cleaner assembly 40 previously described in association with FIG. 1 and as belt cleaner assembly 140 as previously described in association with FIGS. 2A-6, except for the noted differences.

Figure 13B:
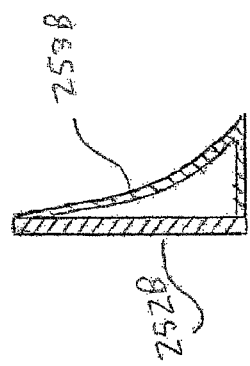
FIG. 13B is a sectional side view schematically illustrating an example support arm including a debris deflector.
Figure 13A:
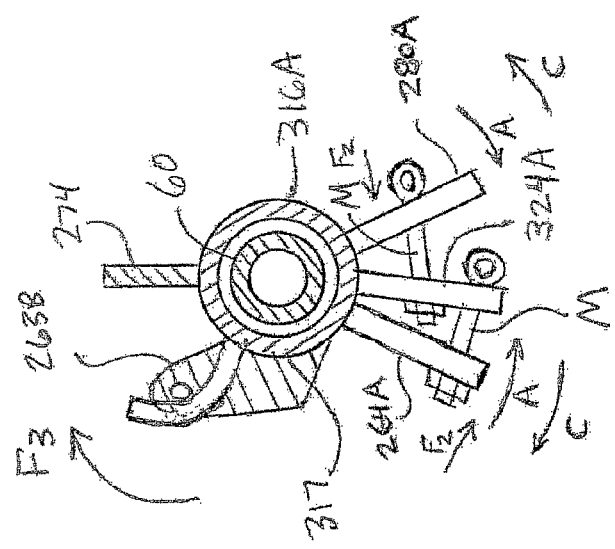
FIG. 13A is a partial sectional side view schematically illustrating the example belt cleaner assembly of FIG. 7.

FIGS. 9-10 are top plan views of the example belt cleaner assembly 240 while FIGS. 11-12 are front elevational views of the example belt cleaner assembly 240. FIG. 13A is a sectional view as taken along lines 13A-13A of FIG. 12.

Figure 7:
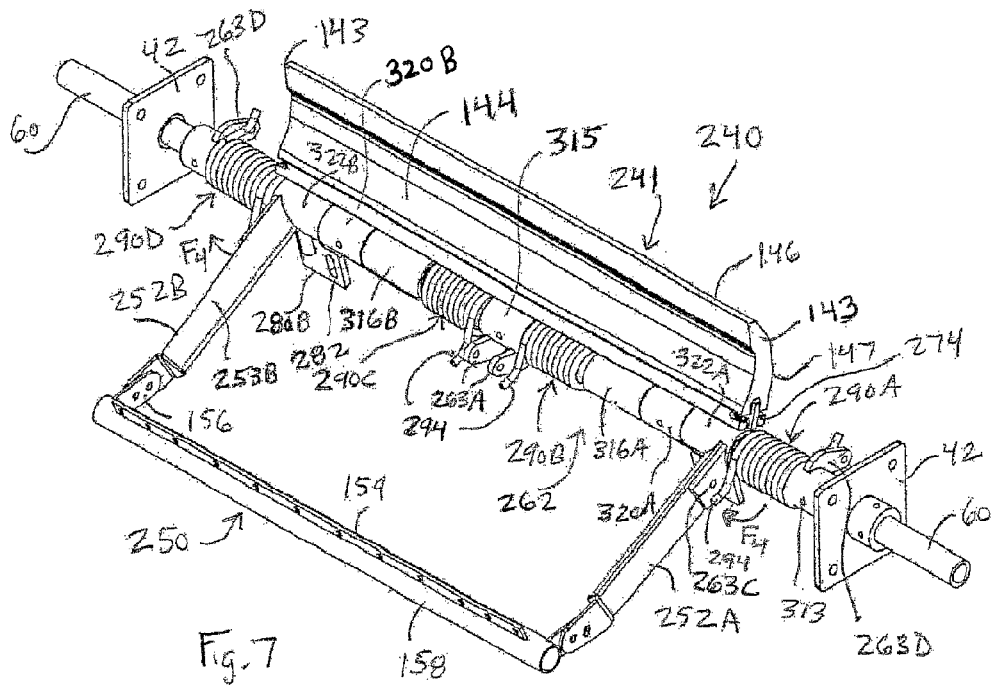
FIG. 7 is a top isometric view schematically illustrating an example belt cleaner assembly.
Figure 8:
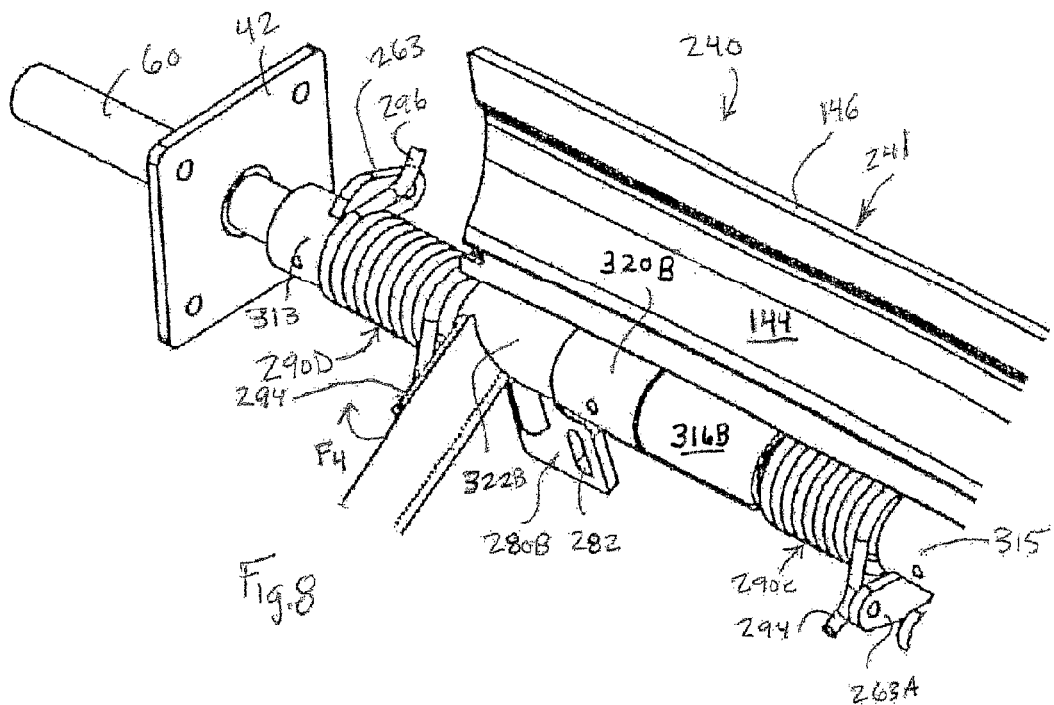
FIG. 8 is an enlarged, partial top isometric view of the example belt cleaner assembly of FIG. 7.

As shown in FIG. 7, except for any dimensional differences, primary blade assembly 241 includes generally the same blade 144 having tip 146 and body 147, as in FIGS. 2A-6. The blade 144 is mounted on a rib 274 of a sleeve assembly 262, in a manner substantially the same as shown in FIGS. 2A-4.

In general terms, the belt cleaner assembly 240 is generally longer (in a direction generally parallel to a longitudinal axis of axle 60) than belt cleaner assembly 140 to accommodate a generally wider belt 32. Accordingly, the belt cleaner assembly 240 includes generally longer components (e.g. blade 144, blade array 157) along with a stronger biasing mechanism to handle the larger components. In one example, as shown in at least FIG. 7, the biasing mechanism for belt cleaner assembly 240 includes four springs 290A-290D instead of just two springs 190A, 190B in the example belt cleaner assembly 140 of FIGS. 2A-6. Accordingly, the inner two springs 290B, 290C provide a rotational biasing force for primary blade assembly 241 while outer two springs 290A, 290D providing the rotational biasing force for secondary blade assembly 250. In addition, belt cleaner assembly 240 includes its own configuration of sleeves, load plates, flanges, etc to enable primary blade assembly 241 and secondary blade assembly 250 to rotate independently of each other relative to axle 60.

As shown in FIG. 7, a primary blade assembly 241 includes a sleeve assembly 262 that includes a first anchor sleeve 315, a pair of sleeve portions 316A, 316B and its own biasing mechanism provided via a pair of springs 290B, 290C.

Secondary blade assembly 250 includes a pair of arms 252A, 252B, sleeves 322A, 322B, collars 313, and its own biasing mechanism provided via a pair of springs 290A, 290D. In one aspect, arms 252A, 252B are spaced apart from each other, with a longitudinal axis of each arm generally aligned with a respective one of the outer edges 143 of primary blade 144. In this example, secondary blade assembly 250 omits a central support arm between arms 257A, 252B.

At outer end of arms 252A,252B, secondary blade assembly 250 includes sleeve 158 and mounting bar 159 (as in the example of FIGS. 2A-6) which are configured to mount a secondary blade array 157, in a manner generally the same as shown in FIGS. 2A-6.

As shown in at least FIGS. 7 and 9, in primary blade assembly 241, spring 290B is interposed between first anchor sleeve 315 and sleeve portion 316A while spring 290C is interposed between first anchor sleeve 315 and sleeve portion 316B. The first anchor sleeve 315 is centrally located along a length of axle 60 and is fixed in a non-rotatable, non-slidable position against axle 60. The first anchor sleeve 315 includes a pair of flanges 263A protruding outwardly away from axle 60 and generally perpendicular to blade 144. Each flange 263A includes a pin (not shown for illustrative clarity) for engaging a free end 294 of each spring 290B, 290C. Meanwhile, as shown in at least FIGS. 9-10 and 13A, a rear portion 317 of sleeves 316A, 316B includes a flange 263B for engaging free end 296 of the respective springs 290B, 290C. Accordingly, springs 290B, 290C are positioned to apply a rotational torsional force (as represented by directional force arrow F3 in FIGS. 9-10) that urges primary blade assembly 241 (including blade 144) inward, in a manner substantially similar that described for primary blade assembly 141 associated with FIGS. 2A-6.

As further shown in at least FIGS. 9-10, 11-12, and 13A, the sleeves 316A, 316B further include a load plate 264A, 264B that protrudes outward from a lower rear surface of the sleeve 316A, 316B. As shown in at least FIGS. 9-10, each load plate 264A, 264B includes a slot 267 for receiving a variable length fastener to apply a compressive force F2 between load plate 264A and intermediate load plate 324A as shown in FIG. 13A and as further described below.

In addition, as best seen in FIG. 13A and in FIGS. 11-12, each sleeve 316A, 316B includes a rib 274 extending generally vertically upward from a top surface portion of the sleeve 316A, 316B. As in the previous example associated with FIGS. 2A-6, the rib 274 is sized, shaped, and positioned to removably, slidably receive a primary blade 144 via slidable mounting of mounting slot 149 onto rib 274 of sleeves 316A, 316B. In this way, sleeves 316A, 316B support primary blade 144 independent of other sleeves 320A, 320B, 322A, 322B, which form part of the secondary blade assembly 250.

As best seen in at least FIGS. 7-8 and 11-12, at a position located laterally outward (along axle 60) to sleeves 316A, 316B, a second anchor sleeve 320A, 320B is fixed in a non-rotatable, non-slidable position relative to axle 60. As further shown in at least FIGS. 11-12, each second anchor sleeve 320A, 320B includes a respective intermediate load plate 324A, 324B having slots 325 and 326 at their opposite ends. Load plates 324A, 324B are not shown in FIGS. 7-8 for illustrative clarity. In one example, this second anchor sleeve 320A, 320B acts as a transition element that forms part of neither primary blade assembly 241 nor secondary blade assembly 250. Rather, this transitional element helps to maintain a position (laterally along axle 60) of primary blade assembly 241 and secondary blade assembly 250 and supports and positions a respective load plate 324A, 324B relative to load plates 264A, 264B and load plates 280A, 280B.

In one example, as best seen in at least FIG. 12, each intermediate load plate 324A, 324B has a length sufficient to overlap a portion of one of the respective load plates 264A, 264B and a portion of one of the respective load plates 280A, 280B. Moreover, intermediate load plates 324A, 324B are sized, shaped, and positioned so that slot 325 of intermediate load plate 324A, 324B aligns with slot 267 of load plates 264A, 264B while slot 326 of intermediate load plate 324A, 324B aligns with slot 282 of load plates 280A, 280B. Accordingly, the stationary load plate 324A, 324B coordinates application of a compressive force of load plate 264A, 264B of primary blade assembly 241 and load plate 280A, 280B of secondary blade assembly 250, as described more fully later.

Secondary blade assembly 250 mounts on axle 60 laterally outward from second anchor sleeves 320A, 320B. Accordingly, in one example, secondary blade assembly 250 includes sleeves 322A, 322B, which are located along axle 60 laterally outward to the second anchor sleeves 320A, 320B, as best seen in FIGS. 7-8 and 11-12. Each sleeve 322A, 322B is rotatable mounted about axle 60 and supports an arm 252A, 252B that supports secondary blade array 157, as previously described in association with FIGS. 7-12. Each sleeve 322A, 322B also includes a load plate 280A, 280B. The load plates 280A, 280B include a slot 282 for receiving a fastener to apply a compressive force in cooperation with a respective one of intermediate load plates 324A, 324B and a respective one of load plates 264A, 261B, as shown in at least FIG. 13A. While omitted in FIG. 13A for illustrative purposes, each sleeve 322A, 322B also supports an arm 252A, 252B as is shown in at least FIGS. 7-8 and 11-12.

As best seen in FIGS. 7 and 12, each sleeve 322A, 322B further includes a flange 263C that protrudes outwardly from a front surface portion of sleeve 322A, 322B in a direction generally parallel with a longitudinal axis of arms 252A, 252B. In one example, flange 263C is joined to an exterior portion of arms 252A, 252B at their inner ends. Via a pin, the flange 263C is configured to engage a free end 294 of spring 290A, 290D. While such pins are omitted for illustrative purposes in FIGS. 7-12, it is noted that FIGS. 2A-6 illustrate a representative depiction of mounting such a pin on flange 263C and how one of the free ends of the springs engage such pins.

Meanwhile, a third anchor sleeve 313 further defines secondary blade assembly 250 and is positioned laterally outward from sleeves 322A, 322B with a spring 290A, 290D interposed between a respective one of the third anchor sleeves 313 and a respective one of the sleeves 322A, 322B. The third anchor sleeve 313 is fixed to axle 60 in a non-rotatable, non-slidable position. A flange 263D protrudes from a rear surface portion of the third anchor sleeve 313 and, through the use of a pin, flange 263D is sized, shaped, and positioned to engage a free end 296 of spring 290A, 290D. Accordingly, third anchor sleeve 313 enables spring 290A, 290D to direct their torsional force has represented by directional force arrow F4 in FIGS. 7-8) to cause rotation of secondary blade assembly 250 without affecting primary blade assembly 241. Recall that rotation of primary blade assembly 241 is controlled independent from the outer springs 290A, 290D and is instead controlled by the inner springs 290B, 290C.

Accordingly, the springs 290A, 290D, sleeves 322A, 322B, anchor sleeves 313 provide a biasing mechanism for secondary blade assembly 250 that acts independently of the biasing mechanism for primary blade assembly 241 provided via springs 290B, 290C, anchor sleeve 315, and sleeves 316. Moreover, anchor sleeves 320A, 320B and load plates 324A, 324B provide a transitional element independent of primary blade assembly 241 and secondary blade assembly 250. In particular, as schematically illustrated in at least FIG. 13A, upon application of a compressive force to the load plates 280A and 264A and to the load plates 280B, 264B, respectively, the respective load plates 324A, 324B provide a stationary anchor against which the compressive forces can act such that the independent biasing mechanisms of the primary blade assembly 241 and of the secondary blade assembly 250 work cooperatively together to cause rotation of the respective blade assemblies 241, 250 away from each other, and away from belt 32, in a manner similar to that previously described for belt cleaner assembly 140 in association with FIGS. 5-6.

Accordingly, while some of the structural details regarding the location and number of springs, sleeves, and load plates of example belt cleaner assembly 240 vary from the example belt cleaner assembly 140, it will be understood that the belt cleaner assembly 240 operates according to the same general principles as previously described in association with FIGS. 5-6 by which primary blade assembly 241 and secondary blade assembly 250 are biased to rotate into engagement against a belt 32.

In this example belt cleaner assembly 240, springs 290A, 290D are located laterally outside of edges 143 of primary blade 144. However, the free end 294 of those springs is positioned to cause the force of the biasing mechanism for the secondary blade assembly 250 to act in alignment with blade edge 143 such that the pivoting action and rotational action of the various components of secondary blade assembly 250 still remains at or within the lateral boundaries of the primary blade 144. While this arrangement is not required, it contributes to maintaining the compact design of the example belt cleaner assembly 240 of the present disclosure.

FIGS. 14-18 illustrate another example belt cleaner assembly 340. In one example, the belt cleaner assembly 340 includes generally the same features and attributes as the belt cleaner assembly 140, 240 as previously described in association with FIGS. 1-13B, except for the noted differences.

Figure 14:
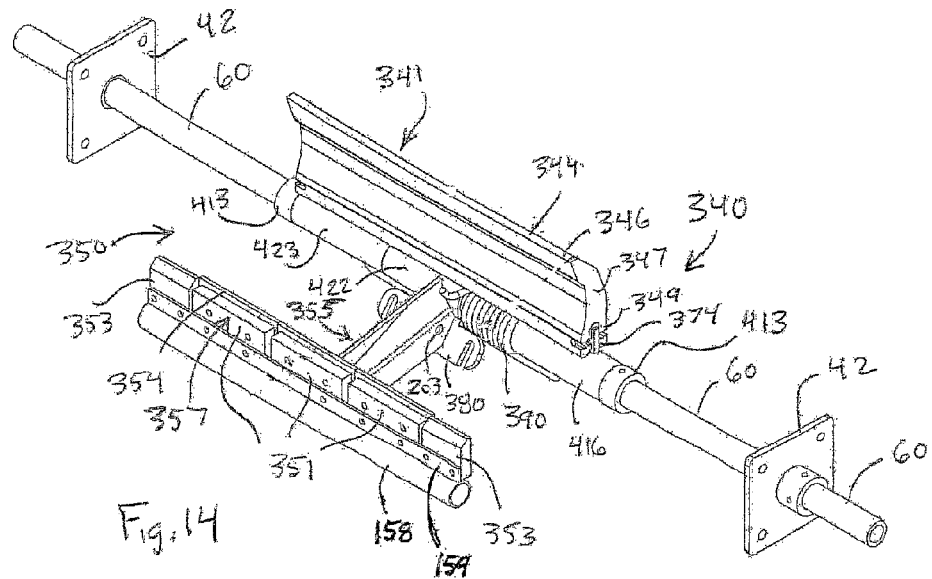
FIG. 14 is a top isometric view schematically illustrating an example belt cleaner assembly.
Figure 15:
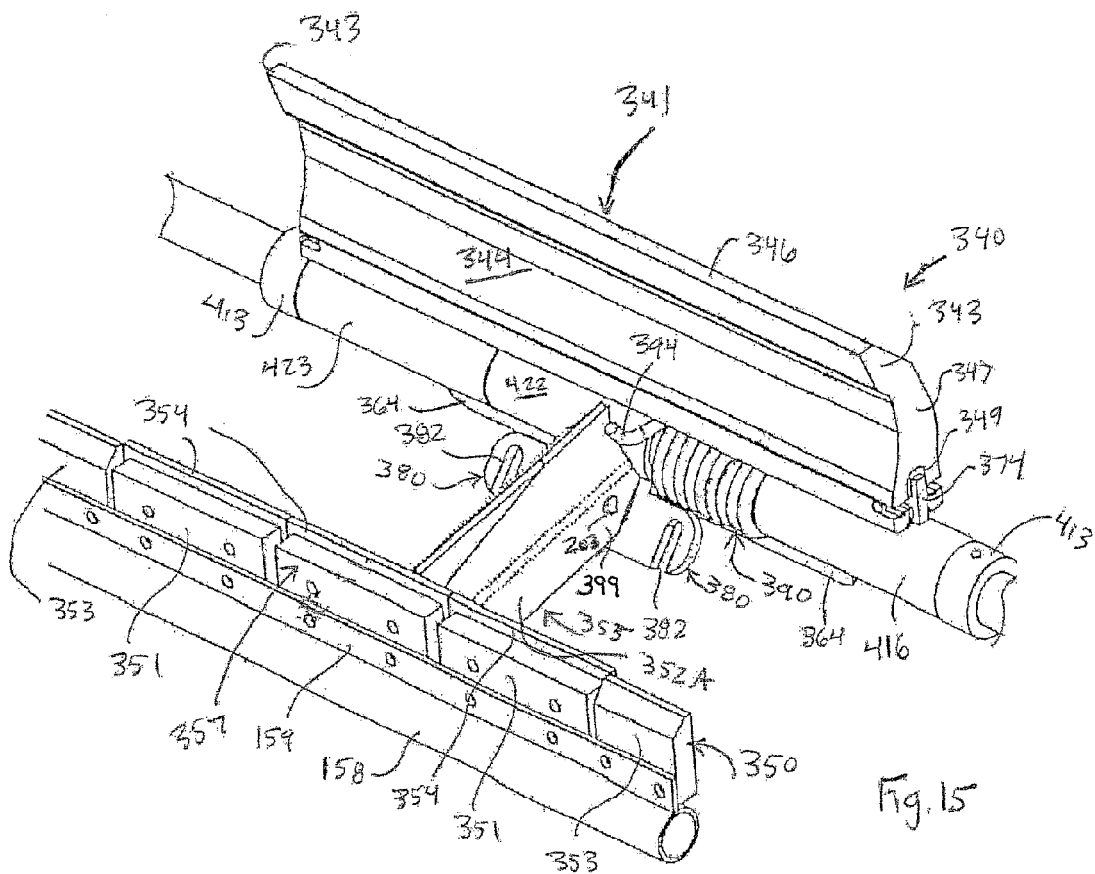
FIG. 15 is an enlarged, partial top isometric view of the example belt cleaner assembly of FIG. 14.

FIG. 14 is a top isometric view of an example belt cleaner assembly 340 while FIG. 15 is an enlarged partial view taken from FIG. 14, FIG. 16 is a top plan view of the example belt cleaner assembly 340 while FIGS. 17A, 17B are sectional views taken along lines 17A-17A, 17B-17B, of FIG. 16. Finally, FIG. 18 is a top plan view schematically illustrating rotatable mounting of primary and secondary blade assemblies on axle 60.

As shown in at least FIGS. 14-16, belt cleaner assembly 340 includes a primary blade assembly 341 and secondary blade assembly 350. The primary blade assembly 341 includes a blade 344 with tip 346, body 347, and mounting slot 349 as in the previous examples. However, in the example shown in FIGS. 14-16, blade 344 is generally shorter to accommodate belts 32 (of conveyor system 30 in FIG. 1) having a narrower width.

Because belt cleaner assembly 340 is generally narrower than the previous examples, the overall mass of the belt cleaner assembly 340 is substantially less than the overall mass of the example belt cleaner assembly 140 (FIGS. 2A-6) or the overall mass of the example belt cleaner assembly 240 (FIGS. 7-13B). Accordingly, belt cleaner assembly 340 includes just one spring 390 to act as a biasing mechanism.

As shown in FIGS. 14-16, the secondary blade assembly 350 includes a sleeve 422, a central support structure 355, a sleeve 158, a mounting bar 159, and an array 357 of secondary blades 351, 353. In one example, the central support structure 355 includes two generally parallel and closely spaced apart support arms 352A, 352B. In one example, such as shown in FIG. 16, the central support structure 355 supports a pair of deflectors 353A, 353B that extend generally upward at an angle relative to a vertical plane. As in previous examples described above, the deflectors 353A, 353B deflect debris and prevent it from collecting on the secondary blade assembly 350.

In one aspect, sleeve 422 is rotatably mounted on axle 60, as best seen in at least FIG. 18. Moreover, as shown in at least FIGS. 14-15 and 17, an inner end of the arms 352A, 352B are connected to and extend outwardly from a front surface portion of sleeve 422. Meanwhile, as best seen in at least FIG. 16, an outer end 357 of the respective support arms 352A, 352B connect to and support a respective one of a pair of flanges 356 that extends inwardly from sleeve 158 in an orientation that is generally parallel to a longitudinal axis of the arms 352A, 352B.

As in previous example secondary blade assemblies 140, 240, the sleeve 158 and mounting bar 159 support the array 357 of blades 351, 353 for contacting and scraping against a belt 32 in a position downstream from a primary blade 344, in a manner similar to that depicted in at least FIG. 1.

Further details regarding sleeve 422 of secondary blade assembly 350 are discussed later in the context of the rotational biasing mechanism provided via spring 390 and the components and structures of the primary blade assembly 341.

As shown in at least FIGS. 14-15 and 18, primary blade assembly 341 includes a first sleeve 416 and a second sleeve 423. Sleeves 416, 423 are rotatably mounted on axle 60, but spaced apart along a length of axle 60. A spring 390 and sleeve 422 (of secondary blade assembly 350) are interposed between the respective sleeves 416, 423 of primary blade assembly 341. As shown in FIG. 18, primary blade assembly 341 includes a load plate 364 that forms a bridge between sleeve 416 and sleeve 423. A first base portion 365A of load plate 364 is connected to and extends from a rear surface portion of sleeve 416 and a second base portion 365B of load plate 364 is connected to and extends from a rear surface portion of sleeve 423. Body 369 of load plate 364 forms a generally planar element that extends between the sleeves 416, 423 so that sleeve 416, load plate 364, and sleeve 423 are joined together to form a united structure such that those respective elements rotate in unison relative to axle 60. A pair of slots 367 is formed in body 369 of load plate 364 and are sized, shaped, and positioned to receive one end of a variable length fastener in cooperation with reception of the other end of the fastener by a load plate 380 of secondary blade assembly 350.

As further shown in FIG. 18, load plate 364 includes a recessed edge 372 (extending between base portions 365A, 365B) such that a gap G6 is formed between a rear surface portion 429 of inner sleeve 422 (of secondary blade assembly 350) and recessed edge 372 of load plate 364. This gap G6 is provided to enable sleeves 416, 423 to rotate simultaneously relative to axle 60 in a coordinated manner while allowing sleeve 422 (which is, along with spring 390, interposed between sleeves 416, 423) to rotate about axle 60 independently in an opposite rotational direction from sleeves 416, 423. In addition, as best seen in the sectional view of FIG. 17B (taken along lines 17B-17B of FIG. 16), sleeve 423 includes an upwardly extending rib 374, which is sized, shaped, and positioned to support primary blade 344 in a generally vertical orientation, such as shown in at least FIGS. 14-15. Sleeve 416 includes a similar arrangement supporting a second rib 374. Via ribs 374, rotation of sleeves 416, 423 about axle 60 cause a corresponding rotation of primary blade 344 about axle 60.

As shown in FIG. 18, an inner end of sleeve 416 further includes a flange 363 that extends generally vertically upward from a rear surface portion of sleeve 416 (in a manner similar to flange 163 shown in FIG. 4).

A helical torsion spring 390 is interposed between central sleeve 422 of secondary blade assembly 350 and outer sleeve 416 of primary blade assembly 341 such that spring 390 is positioned immediately adjacent flange 363 of outer sleeve 416. Spring 390 is mounted on axle 60 with spring 390 including a central coil portion 392 and a pair of free ends 394, 396. As best seen in at least FIG. 18, free end 396 of spring 390 engages flange 363 (via a pin 202) while free end 394 of spring 390 is available and positioned to engage an inner portion 399 of support arm 352A (of secondary blade assembly 350) at location 203, as shown in FIGS. 14-16. Location 203 may bear a pin like pin 200 seen in at least FIG. 2A.

With this arrangement, coil spring 390 is mounted under torsion such that free end 396 applies a rotational force urging flange 363 and sleeve 416 to rotate forward (as represented by directional force arrow F5 in FIG. 16), which in turn causes rotation of the rest of the primary blade assembly 341 (including load plate 364, sleeve 423, and primary blade 344). Meanwhile, free end 394 of spring 390 applies a rotational force urging inner portion 399 of arm 352A to rotate generally upward (as represented by directional force arrow F6 in FIG. 16), which in turn causes rotation of the rest of secondary blade assembly 350 (including sleeve 422, load plate 380, central support structure 355, sleeve 158, and the array 357 of blades 351, 353).

The biasing action provided via the rotational forces applied via free ends 394, 396 of spring 390 is further schematically represented in FIG. 17A, which provides a partial sectional view of belt cleaner assembly 340 as taken along lines 17A-17A of FIG. 16. In particular, FIG. 17A schematically illustrates rotational movement (directional arrow C1) caused via the torsional force of spring 390 (via free end 396) acting on sleeves 416, 423, etc of primary blade assembly 341 and the rotational movement (directional arrow C2) caused via the torsional force of spring 390 (via free end 394) acting on sleeves 422, arms 352A, 352B etc of secondary blade assembly 350. Accordingly, belt cleaner assembly 340 operates according to generally the same principles of the previously described example belt cleaner assemblies 140, 240.

Moreover, in a manner substantially the same as previously described for at least example belt cleaner assemblies in association with FIGS. 5-6, the example belt cleaner assembly 340 also is manipulable into an installation configuration or maintenance configuration in which the biasing forces acting on the primary and secondary blade assemblies 341, 350 are selectively counteracted during installation and/or during maintenance. Accordingly, upon placing a variable length fastener to be coupled between load plates 364 and 380, a compressive force is applied (e.g. forces F2 in FIG. 5) to drive the load plates 364, 380 together. This action, in turn, causes rotational movement of load plates 364, 380 toward each other (as represented by directional arrows A), which in turn, causes rotation of primary blade assembly 341 away from belt 32 and secondary blade assembly 350 away from belt 32 (at a location downstream from primary blade 344).

As shown in FIGS. 14-16, in sonic example belt cleaner assemblies, the secondary blade assembly 350 further includes a pair of deflectors 353A, 353B extending generally upward from arm 352A, 352B and at an angle relative to a vertical plane. The deflectors 353A, 353B prevent a buildup of material on arms 352A, 352B. In one example, as best seen in at least FIG. 16, the deflectors 353A, 353B have upper edges that touch each other but then become spaced apart as the upper edges taper away from each other as the deflectors 353A, 353B extend further away from inner end 399 of arms 352A, 352B.

Example belt cleaner assembly 340 provides a compact mechanism for cleaning a conveyor belt. A central support structure 355 is generally centrally located to support a secondary blade assembly 350. A single spring 390 provides the rotational biasing mechanism for both the primary and secondary blade assemblies 341, 350. As in the previously described example belt cleaner assemblies 140, 240, all the operative components (e.g. sleeves, flanges, springs, etc.) of example belt cleaner assembly 340 are located within the boundaries of the primary blade edges 343.

FIG. 19 is a top plan view schematically illustrating an example belt cleaner assembly 440. As shown in FIG. 19, example belt cleaner assembly 440 includes a primary blade assembly 441 and a secondary blade assembly 450, which are both rotatably mounted on axle 60. Like the previous example secondary blade assemblies 150, 250, 350, the secondary blade assembly 450 includes several support arms 452A-452C that support an array 457 of secondary blades. However, in the example belt cleaner system 440, an array 475 of shock absorbing elements 480 are interposed between each respective arm 452A, 452B, 452C and the combined sleeve 458 and mounting bar 459 (on which array 457 of blades is mounted). In one example, the shock absorbing elements are made of an elastomeric material. In some examples, the shock absorbing elements are mounted between a pair of plates 491, 492. In some example, a single shock absorbing element is interposed between each respective arm 452A, 452B, 452C and the mounting bar 459 (and sleeve 458). In other examples, multiple shock absorbing elements are interposed between each respective arm 452A, 452B, 45C and the mounting bar 459 (and sleeve 458). Among other functions, the shock absorbing elements 480 mitigate any shocks experienced by secondary blade assembly 450 and thereby maximize contact of the secondary blade array 457 with the conveyor belt 32.

Example belt cleaner assemblies of the present disclosure are directed at providing compact, effective cleaning of a conveyor belt via a single belt cleaner assembly having two blades that engage a conveyor belt at spaced apart locations along the conveyor belt.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

What is claimed is:

1. A cleaner assembly for a conveyor belt comprising:
   an axle;
   a first blade assembly pivotally mounted on the axle, the first blade assembly including a first blade for contacting a conveyor belt adjacent a turn portion of the belt;
   a second blade assembly pivotally mounted on the axle independent of the first blade assembly, the second blade assembly including a second blade for contacting the belt downstream from the first blade;
   wherein the first and second blades are biased toward one another by a biasing mechanism, at least a portion of the biasing mechanism being located between opposite ends of at least the first blade.

2. The assembly of claim 1, wherein the entire biasing mechanism is located between opposite ends of the first blade.

3. The cleaner assembly of claim 2, wherein
   the axle has a longitudinal axis generally parallel to at least one of the respective first and second blades.

4. The assembly of claim 3, wherein each of the first and second blade assemblies include at least one portion that is pivotally coupled relative to the axle at locations interposed between opposite ends of the first blade.

5. The assembly of claim 1, wherein the second blade assembly includes an elongate support structure including a first end on which the second blade is mounted and an opposite second end supported by the axle.

6. The assembly of claim 5, wherein upon mounting of the cleaner assembly adjacent the turn portion of the belt, the first blade extends in a first orientation and the support structure of the second blade assembly extends in a second orientation generally perpendicular to the first orientation.

7. The assembly of claim 5, wherein the support structure includes at least one arm having a longitudinal axis generally perpendicular to a longitudinal axis of the axle.

8. The assembly of claim 7, wherein the at least one arm includes a pair of arms spaced apart from each other by a distance generally corresponding to a length of the second blade.

9. The assembly of claim 8, wherein the at least one arm includes a third arm interposed between the pair of arms.

10. The assembly of claim 1,
wherein the second end of the second blade assembly and at least one portion of the first blade assembly each include at least one sleeve coaxially mounted about the axle.

11. The assembly of claim 10, wherein the at least one sleeve of the first blade assembly includes a pair of first sleeves spaced apart from each other along a length of the axle.

12. The assembly of claim 11, wherein the first blade assembly includes a bridge member extending between and connecting the spaced apart first sleeves, wherein the bridge member is radially spaced apart from, and defines a gap relative to, at least the axle.

13. The assembly of claim 12, wherein the at least one sleeve of the second blade assembly is interposed between the pair of first sleeves and is at least partially coextensive with the bridge member, wherein the second sleeve is pivotally movable within the gap.

14. The assembly of claim 13, and further comprising a biasing mechanism configured to bias the first blade and the second blade to pivot toward each other, wherein the biasing mechanism includes a pair of springs spaced apart along the length of the axle and located laterally external of at least the first sleeves.

15. The assembly of claim 14, wherein the biasing mechanism includes at least one spring interposed between the spaced apart first sleeves.

16. The assembly of claim 14, wherein the bridge member defines a first plate extending radially outward relative to the axle, wherein the second sleeve includes a second plate extending radially outward relative to the axle, and wherein the first plate and the second plate are biased, via the biasing mechanism, to pivot away from each other,
wherein the first plate and the second plate are positioned and configured to selectively receive a compressive force to cause movement of the first plate and the second plate pivotally toward each other to cause the first and second blade assemblies to pivot away from each other to a corresponding degree.

17. The assembly of claim 16, wherein the first plate and the second plate are in axial alignment with each other adjacent a mid-portion of a length of the first blade.

18. The assembly of claim 16, wherein the first and second plates are each configured to be releasably engaged by a fastening mechanism to supply the compressive force.

19. The assembly of claim 11, and further comprising a biasing mechanism configured to bias the first blade and the second blade to pivot toward each other, wherein the biasing mechanism includes at least one spring interposed between the spaced apart first sleeves and wherein the at least one sleeve of the second blade assembly includes a pair of second sleeves spaced apart along a length of the axle, with each second sleeve located laterally externally to a respective one of the first sleeves.

20. The assembly of claim 19, wherein each respective first sleeve includes a first plate extending radially outward relative to the axle, wherein each respective second sleeve includes a second plate extending radially outward relative to the axle, and wherein the first plates and the second plates are biased, via the biasing mechanism, to pivot away from each other,
wherein a respective one of the first plates and a respective one of the second plates are adjacent to each other and adjacent an end of the first blade, and positioned and configured to selectively receive a compressive force to cause movement of the respective one first plate and the respective one second plate pivotally toward each other to cause the first and second blade assemblies to pivot away from each other to a corresponding degree.

21. The assembly of claim 1, wherein the second blade assembly includes:
an elongate support structure including a first end on which the second blade is mounted and an opposite second end supported by the coupling mechanism; and
a deflector portion located at least partially at a top portion of the support structure.

22. The assembly of claim 1, wherein the second blade assembly includes:
an elongate support structure including a first end on which the second blade is mounted and an opposite second end supported by the axle; and
a shock absorbing mechanism interposed between the second blade and the axle.

23. A conveyor belt system comprising:
a conveyor belt supported by, and extending about, at least a pulley;
a belt cleaner assembly mounted adjacent the pulley, the cleaner assembly including:
a first blade assembly including a first blade positionable into engagement against the conveyor belt adjacent the head pulley, wherein the first blade extends generally in a first orientation;
a second blade assembly includes an elongate support structure extending in a second orientation generally perpendicular to the first orientation, the support structure including a first end on which a second blade is mounted and an opposite second end, wherein the second blade is positionable into engagement against the belt downstream from the first blade;
a coupling mechanism including:
an axle to which at least one sleeve of the first blade assembly and the second end of the second blade assembly are pivotally coupled for pivotal movement independent of each other and at locations between the opposite ends of the first blade, wherein the axle is generally parallel to a longitudinal axis of each of the respective first and second blades;
a biasing mechanism mounted on the axle and configured to bias the first blade and the second blade to pivot toward each other, wherein at least a portion of the biasing mechanism is located between opposite ends of the first blade.

24. The system of claim 23, wherein the at least one sleeve of the first blade assembly includes a pair of first sleeves spaced apart from each other in a direction generally parallel to the longitudinal axis of the axle, and wherein the first blade assembly includes a connecting member extending between and connecting the spaced apart first sleeves, wherein the connecting member is radially spaced apart from, and defining a gap relative to, the axle.

25. The system of claim 24, wherein the at least one sleeve of the second blade assembly is interposed between the pair of first sleeves and at least partially coextensive with the connecting member, wherein the second sleeve is pivotally movable within the gap, and wherein the biasing mechanism includes a pair of springs spaced apart along the length of the common axle and located laterally external of at least the first sleeves.

26. The system of claim 25, wherein the connecting member defines a first plate extending generally outward relative to the axle, wherein the second sleeve includes a second plate extending generally outward relative to the axle, and wherein the first plate and the second plate are biased, via the biasing mechanism, to pivot away from each other, wherein the first plate and the second plate are positioned and configured to selectively receive a compressive force to cause movement of the first plate and the second plate pivotally toward each other to cause the first and second blade assemblies to pivot away from each other to a corresponding degree.

27. A method of manufacturing a belt cleaning assembly, the method comprising:

providing a first blade assembly having a first blade and a second blade assembly having a second blade, the first blade assembly including a first sleeve supporting the first blade, and the second blade assembly including an elongate support structure having a first end and an opposite second end with the first end supporting the second blade and the second end including a second sleeve;

pivotally mounting the first sleeve of the first blade assembly and the second sleeve of the second blade assembly relative to a common axle to cause the first and second blade assemblies to be pivotally movable independent of each other and to cause a longitudinal axis of the first blade to be generally parallel to a longitudinal axis of the common axle, wherein at least one of the first and second sleeves are located between opposite ends of the first blade;

mounting a biasing mechanism relative to the common axle, and located at least partially between opposite ends of a first blade of the first blade assembly, to cause biased pivotal movement of the first and second blade assemblies toward each other; and arranging the common axle to be mountable adjacent a turn portion of a conveyor belt to cause the first blade to be positionable into biased pivotal movement toward, and engagement against, the conveyor belt adjacent the turn portion of the belt and to cause the second blade to be positionable into biased pivotal movement toward, and engagement against, the belt downstream from the second blade.

28. A conveyor belt cleaner for a bulk material belt conveyor having a pulley, the belt cleaner comprising:

an axle mountable adjacent to the pulley;

a first blade assembly pivotally mounted on the axle, the first blade assembly including a first blade for contacting a conveyor belt adjacent to a first portion of the pulley;

a second blade assembly pivotally mounted on the axle independent of the first blade assembly, the second blade assembly including a second blade for contacting the conveyor belt adjacent to a second portion of the pulley; and at least one spring coupled between the first and second blade assemblies to bias the first and second blades towards one another.

* * * * *